US008397115B2

(12) United States Patent
Kimura

(10) Patent No.: US 8,397,115 B2
(45) Date of Patent: Mar. 12, 2013

(54) PHASE ERROR DETECTION DEVICE, PHASE ERROR DETECTING METHOD, INTEGRATED CIRCUIT AND OPTICAL DISC DEVICE

(75) Inventor: Naohiro Kimura, Kyoto (JP)

(73) Assignee: Panasonic Corporation, Osaka (JP)

( * ) Notice: Subject to any disclaimer, the term of this patent is extended or adjusted under 35 U.S.C. 154(b) by 509 days.

(21) Appl. No.: 12/640,218

(22) Filed: Dec. 17, 2009

(65) Prior Publication Data
US 2010/0169730 A1 Jul. 1, 2010

(30) Foreign Application Priority Data

Dec. 25, 2008 (JP) ................... 2008-329336

(51) Int. Cl.
*G06F 11/00* (2006.01)
(52) U.S. Cl. ..................... 714/746; 369/53.35
(58) Field of Classification Search .................. 714/746; 369/53.35, 47.28
See application file for complete search history.

(56) References Cited

U.S. PATENT DOCUMENTS

| 5,892,474 A * | 4/1999 | Sugawara ...................... 341/200 |
| 6,144,627 A * | 11/2000 | Muto ............................ 369/30.21 |
| 6,404,363 B1 * | 6/2002 | Park et al. ...................... 341/110 |
| 6,728,894 B2 * | 4/2004 | McEwen et al. ............... 713/503 |
| 6,964,007 B2 * | 11/2005 | Lee et al. ........................ 714/798 |
| 7,483,478 B2 | 1/2009 | Kikugawa et al. |
| 7,518,963 B2 * | 4/2009 | Tokuyama .................. 369/47.28 |
| 7,869,327 B2 * | 1/2011 | Miyashita et al. .......... 369/53.35 |
| 2004/0170094 A1 * | 9/2004 | Takehara .................... 369/44.36 |
| 2006/0044990 A1 * | 3/2006 | Kawabe et al. ........... 369/124.14 |
| 2006/0280240 A1 | 12/2006 | Kikugawa et al. |
| 2007/0025217 A1 * | 2/2007 | Miyaoka et al. ........... 369/53.34 |
| 2008/0231332 A1 * | 9/2008 | Nakata et al. ................. 327/147 |
| 2009/0136219 A1 | 5/2009 | Kikugawa et al. |
| 2010/0172225 A1 * | 7/2010 | Hirayama et al. .......... 369/47.53 |

FOREIGN PATENT DOCUMENTS

JP    2006-344294    12/2006

* cited by examiner

*Primary Examiner* — Philip Guyton
(74) *Attorney, Agent, or Firm* — Wenderoth, Lind & Ponack, L.L.P.

(57) ABSTRACT

A phase error detection device detects a phase error, based on an output from an A/D conversion section that performs A/D conversion on an analog input signal in accordance with a sampling clock to generate a digital reproduction signal. The phase error detection device includes a phase error generation section that generates the phase error from the output from the A/D conversion section, and a phase error correction section that corrects the phase error. Herein, the phase error correction section determines a phase error detection range from past phase errors and, when the phase error generated by the phase error generation section is out of the phase error detection range, corrects the phase error.

9 Claims, 25 Drawing Sheets

PHASE ERROR DETECTION DEVICE, PHASE ERROR DETECTING METHOD, INTEGRATED CIRCUIT AND OPTICAL DISC DEVICE

BACKGROUND OF THE INVENTION

1. Field of the Invention

The present invention relates to a phase error detection device, a phase error detecting method, an integrated circuit and an optical disc device each applied to PLL (Phase Locked Loop) for generating a clock brought into phase synchronization with a reproduction signal in order to detect a phase error.

2. Description of the Background Art

As the density of optical discs increases from CDs (Compact Discs) to DVDs (Digital Versatile Discs) and, further to BDs (Blu-ray Discs), such signal processing method as PRML (Partial Response Maximum Likelihood) has become popular. For example, PR (1, 2, 2, 1) ML is employed for a BD with a recording capacity of 25 GB per layer and PR (1, 2, 2, 2, 1) ML is employed for a BD with a recording capacity of 33.3 GB per layer (e.g., refer to "Illustrated Blu-ray Disc Reading Book", Ohmsha).

In PR (1, 2, 2, 2, 1), as shown in FIG. 25, a signal level continuously takes a value of 0 at a portion where a 2T mark and a 2T space are arranged sequentially. A reliable phase error can not be extracted from a 2T signal portion by a conventional phase error detecting method for detecting a zero-cross point. JP-A-2006-344294 discloses one example in which such a phase error in the 2T signal portion is neglected. In order to exclude the 2T signal portion more accurately, binarization must be performed with good accuracy. Examples of the accurate binarizing method include a convolutional code maximum likelihood decoding method such as a Viterbi decoding method for executing maximum likelihood decoding through use of a repeat structure of a convolutional code.

Incidentally, there is a strong demand for quick recording/reproducing performance along with increase of a recording capacity. In order to make a recording/reproducing time for one disc constant, for example, it is necessary to perform recording/reproducing operations quickly while increasing the recording capacity of the disc.

However, the use of the Viterbi decoding method requires much computing operations. In order to perform the computing operations quickly, pipeline processing must be performed. However, frequent use of pipeline processing causes increase of a delay time during which a phase error is fed back. The increase of such a delay results in a possibility that PLL becomes unstable.

In the conventional phase error detecting method, when a phase error detection range is ±180°, phase inversion occurs repeatedly as a result of detection if a frequency error occurs. Consequently, it takes much time to achieve phase synchronization, and this disadvantage causes a problem that the PLL becomes deteriorated in stability.

SUMMARY OF THE INVENTION

It is an object of the present invention to provide a phase error detection device, a phase error detecting method, an integrated circuit and an optical disc device, that allow detection of a phase error exceeding ±180° even when a frequency error occurs and also allow improvement in stability of PLL.

In order to accomplish this object, a phase error detection device according to one aspect of the present invention is a phase error detection device for detecting a phase error, based on an output from an A/D conversion section that performs A/D conversion on an analog input signal in accordance with a sampling clock to generate a digital reproduction signal. The phase error detection device includes: a phase error generation section that generates the phase error from the output from the A/D conversion section; and a phase error correction section that corrects the phase error. The phase error correction section determines a phase error detection range from past phase errors and, when the phase error generated by the phase error generation section is out of the phase error detection range, corrects the phase error.

According to this configuration, the phase error correction section determines a phase error detection range from past phase errors. Then, when a phase error generated by the phase error generation section is out of the phase error detection range, the phase error correction section corrects the phase error. Thus, the phase error detection device allows detection of a phase error exceeding ±180° even when a frequency error occurs between a sampling clock and a digital reproduction signal. When being applied to PLL, the phase error detection device allows improvement in stability of the PLL.

Other objects, characteristics and advantages of the present invention shall be sufficiently clarified by the description herein below. The excellent aspects of the present invention shall be clarified in the following description with reference to the accompanying drawings.

DETAILED DESCRIPTION OF THE PREFERRED EMBODIMENTS OF THE INVENTION

A phase error detection device, a phase error detecting method, an integrated circuit and an optical disc device according to preferred embodiments of the present invention will be described below with reference to the accompanying drawings. It should be noted that each of the following preferred embodiments is merely one example for embodying the present invention, and therefore does not intend to limit the technical scope of the present invention.

First Embodiment

A phase error detection device, a phase error detecting method, an integrated circuit and an optical disc device according to a first embodiment of the present invention will be described below with reference to FIG. 1 through FIG. 12.

Figure 1:
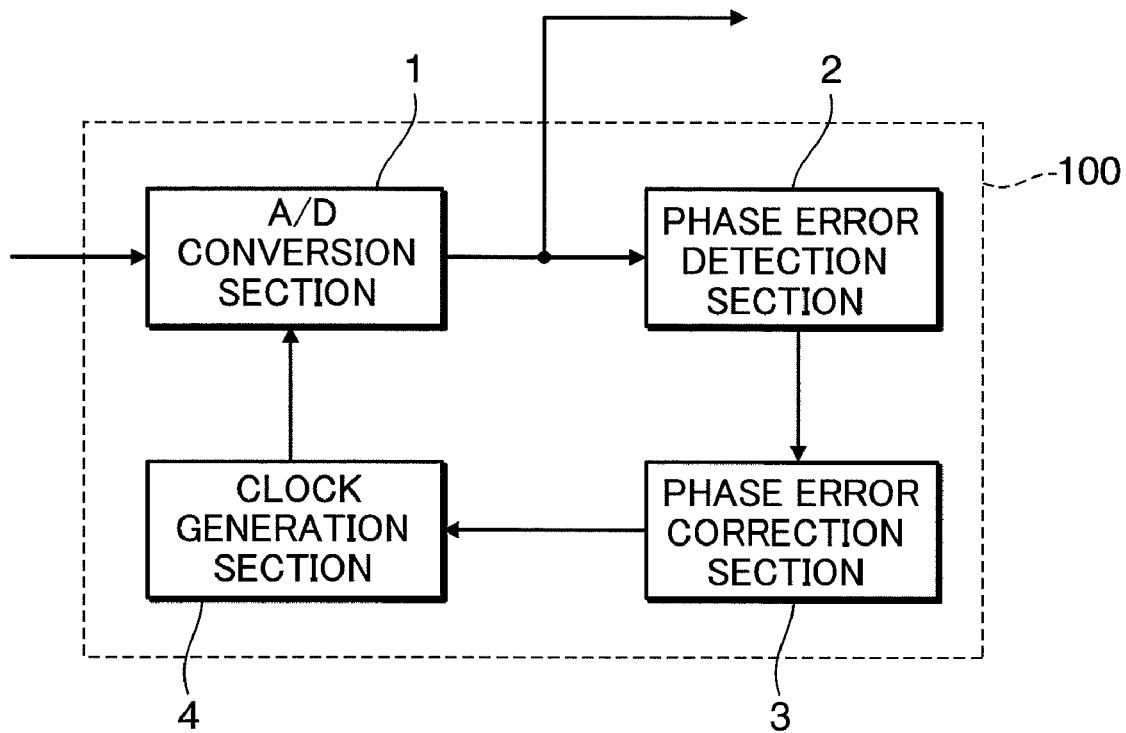
FIG. 1 is a block diagram showing a schematic configuration of a PLL section, according to a first embodiment of the present invention.

FIG. 1 is a block diagram showing a schematic configuration of a PLL section 100 to which the phase error detection device according to the present embodiment is applied. As shown in FIG. 1, the PLL section 100 includes an A/D conversion section 1, a phase error detection section 2 (phase error generation section), a phase error correction section 3 and a clock generation section 4. Herein, the phase error detection section 2 and the phase error correction section 3 constitute the phase error detection device according to the present embodiment.

The A/D conversion section 1 performs A/D conversion on a reproduction signal to be input thereto, in accordance with a clock (a sampling clock) from the clock generation section 4 to generate a digital reproduction signal. The phase error detection section 2 generates a phase error, based on the digital reproduction signal generated by the A/D conversion section 1. The phase error correction section 3 determines whether the phase error generated by the phase error detection section 2 falls within a predetermined range determined from past phase errors. When determining that the phase error is out of the predetermined range, the phase error correction section 3 corrects the phase error to generate a correction phase error. When determining that the phase error is within the predetermined range, on the other hand, the phase error correction section 3 performs no signal processing on the phase error and outputs the phase error as a correction phase error. The clock generation section 4 generates a clock in accordance with the corrected phase error generated by the phase error correction section 3. For example, the clock generation section 4 may be a VCO (Voltage Controlled Oscillator).

Figure 2:
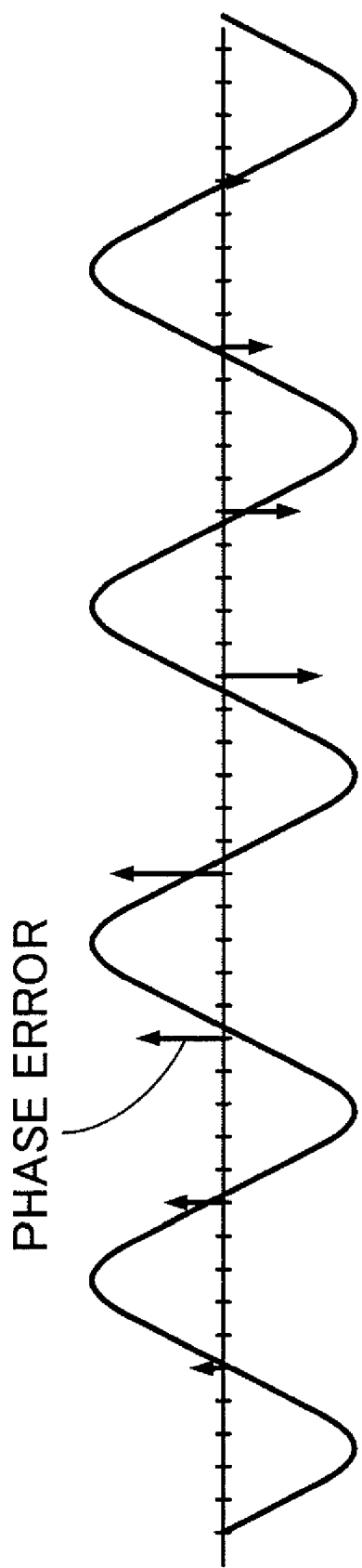
FIG. 2 is an explanatory diagram for explaining a phase error to be generated by a phase error detection section, according to the first embodiment of the present invention.

Next, a phase error to be generated by the phase error detection section 2 will be described with reference to FIG. 2. An arrow mark shown in FIG. 2 indicates a phase error detected in a case where a clock generated by the clock generation section 4 is slightly higher in frequency than a 5T single signal (i.e., in a case where a phase of the clock advances). In FIG. 2, a length of an arrow mark indicates a degree of a phase error, and a direction of the arrow mark indicates an advance/delay of a phase. Specifically, an upward arrow mark indicates a phase advance and a downward arrow mark indicates a phase delay.

As shown in FIG. 2, a phase advance which is relatively small in degree is detected first, and the degree of the phase advance increases gradually. When a phase error exceeds 180°, then, a phase delay which is relatively large in degree is detected, and the degree of the phase delay decreases gradually. When the phase error is fed back as it is to the clock generation section 4, the phase error in the phase advance and the phase error in the phase delay are offset because of repeated phase inversion, and this state results in lagging of phase synchronization.

Figure 3:
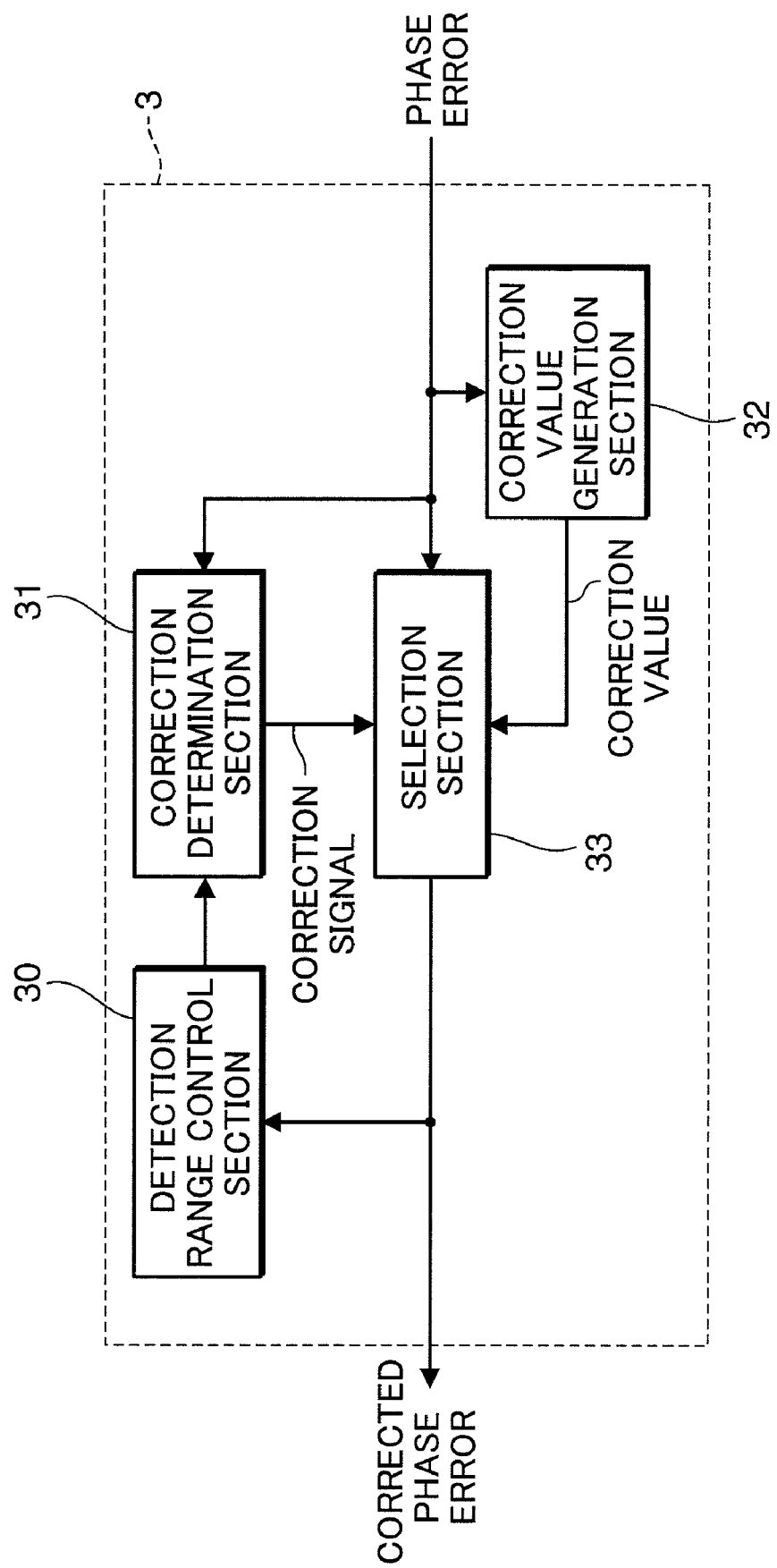
FIG. 3 is a block diagram showing a configuration of a phase error correction section, according to the first embodiment of the present invention.

In order to avoid this disadvantage, the PLL section 100 according to the present embodiment includes the phase error correction section 3 having a characteristic configuration to be described below. As shown in FIG. 3, the phase error correction section 3 includes a detection range control section 30, a correction determination section 31, a correction value generation section 32 and a selection section 33.

The detection range control section 30 determines a phase error detection range from past phase errors. For example, the detection range control section 30 calculates an average value of past three correction phase errors output from the selection section 33, and sets a range of ±180° with respect to the average value as the phase error detection range. It should be noted that the number of past phase errors (or past correction phase errors) used for determining the phase error detection range is not limited to three, but may be two or may be four or more.

The correction determination section 31 compares a phase error input thereto by the phase error detection section 2 with the phase error detection range determined by the detection range control section 30. When the phase error is out of the phase error detection range, the correction determination section 31 outputs a correction signal to the selection section 33. The correction value generation section 32 generates a correction value by inverting a direction of the phase error generated by the phase error detection section 2 without changing a degree of the phase error, and outputs the correction value to the selection section 33. When receiving the correction signal from the correction determination section 31, the selection section 33 outputs the correction value from the correction value generation section 32 to the clock generation section 4. When receiving no correction signal from the correction determination section 31, on the other hand, the selection section 33 outputs the phase error from the phase error detection section 2 as a correction phase error to the clock generation section 4.

Figure 4:
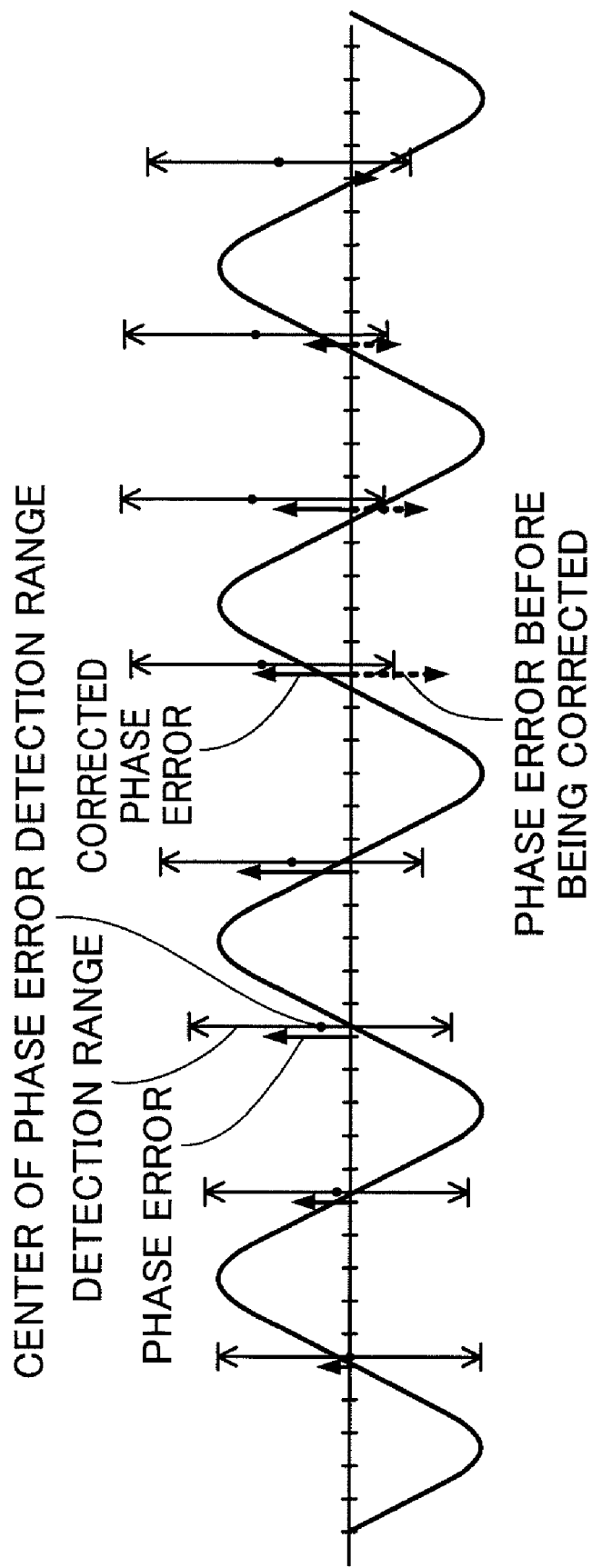
FIG. 4 is an explanatory diagram showing one example of phase error correction to be performed by the phase error correction section, according to the first embodiment of the present invention.

FIG. 4 shows a correction phase error generated by the PLL section 100 including the phase error correction section 3 according to the present embodiment. As shown in FIG. 4, the PLL section 100 according to the present embodiment can output an advancing phase error in a wider section as compared with the case shown in FIG. 2. Therefore, the PLL section 100 becomes stable and allows phase synchronization even when a large frequency error occurs.

Figure 5:
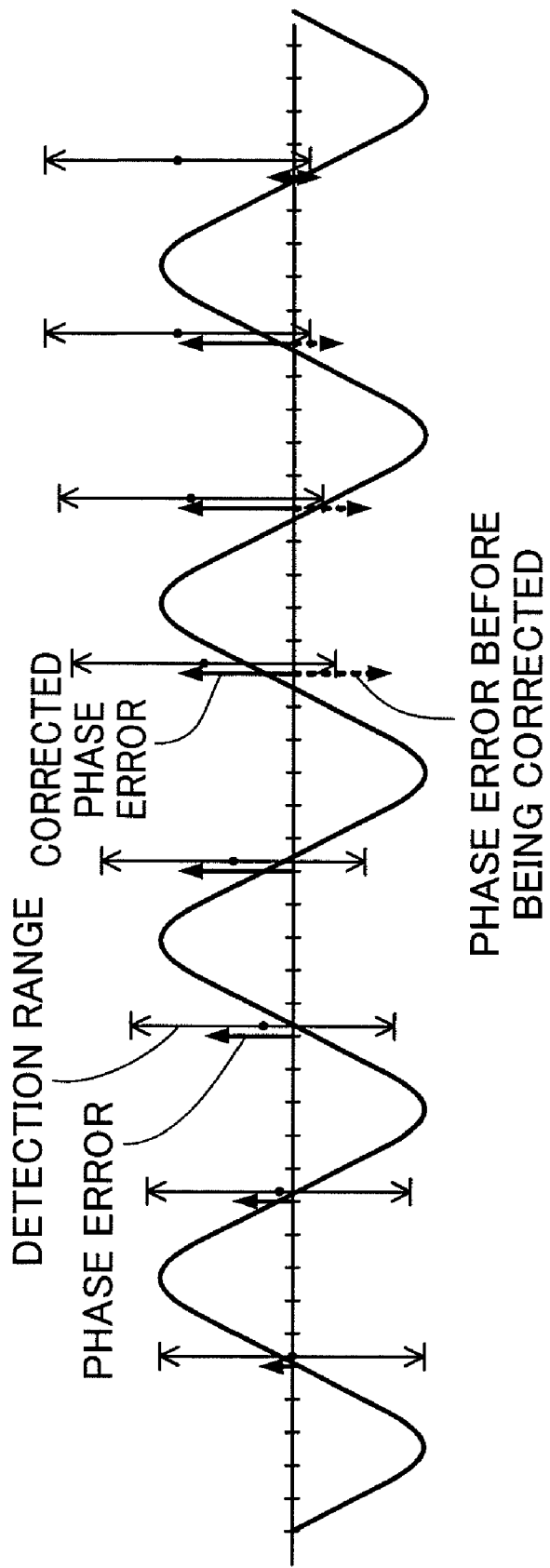
FIG. 5 is an explanatory diagram showing another example of phase error correction to be performed by the phase error correction section, according to the first embodiment of the present invention.

It is preferable that the correction value generation section 32 generates the correction value which is opposite in direction to the phase error and has a predetermined degree. For example, it is assumed herein that the predetermined degree is 180°. FIG. 5 shows a correction phase error corresponding to the phase error shown in FIG. 2. Herein, the correction value generation section 32 generates a correction value with a phase advance of 180° (+180°) even in a case where the phase error is a phase delay of 150° (−150°) and even in a case where the phase error is a phase delay of 120° (−120°).

Figure 6:
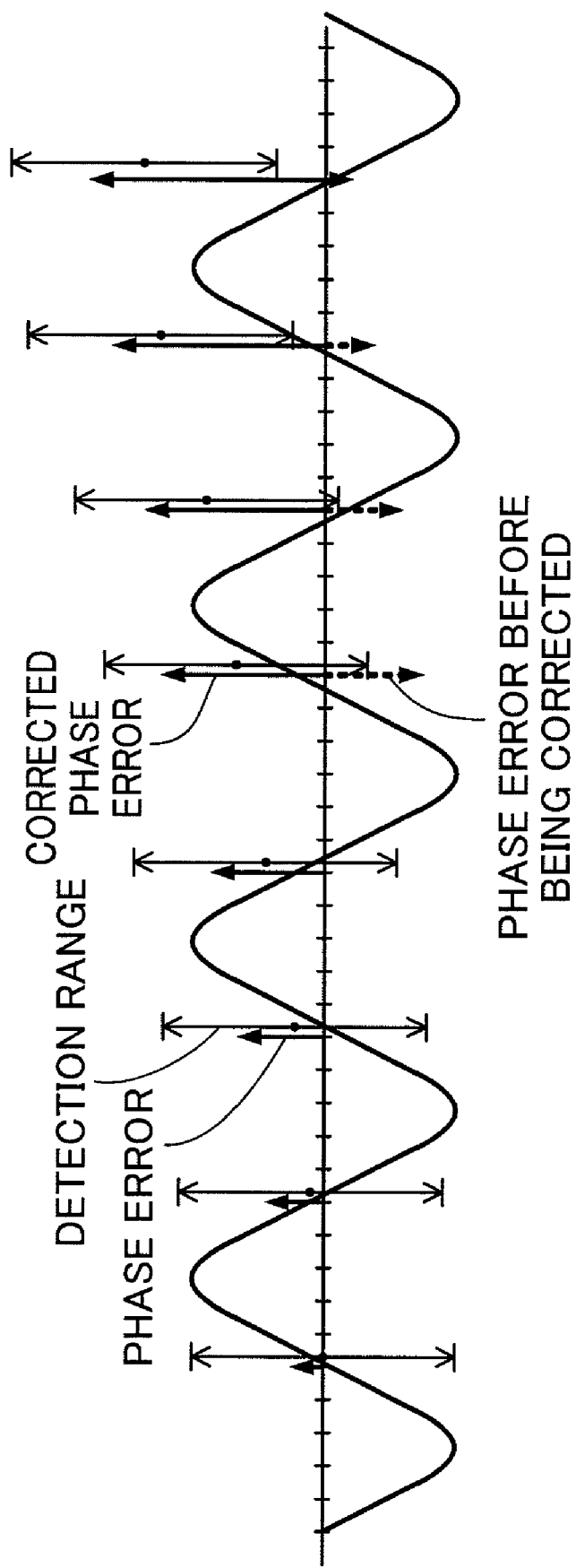
FIG. 6 is an explanatory diagram showing still another example of phase error correction to be performed by the phase error correction section, according to the first embodiment of the present invention.

It is also preferable that the correction value generation section 32 generates the correction value by adding, to the phase error, a value which is opposite in sign to the phase error and has a degree of 360°. FIG. 6 shows a correction phase error corresponding to the phase error shown in FIG. 2. In a case where the phase error is a phase delay of 150° (−150°), the correction value generation section 32 adds a value of +360° to the phase error to generate a correction value with a phase advance of 210° (+210°). On the other hand, in a case where the phase error is a phase delay of 120° (−120°), the correction value generation section 32 adds a value of +360° to the phase error to generate a correction value with a phase advance of 240° (+240°).

Figure 7:
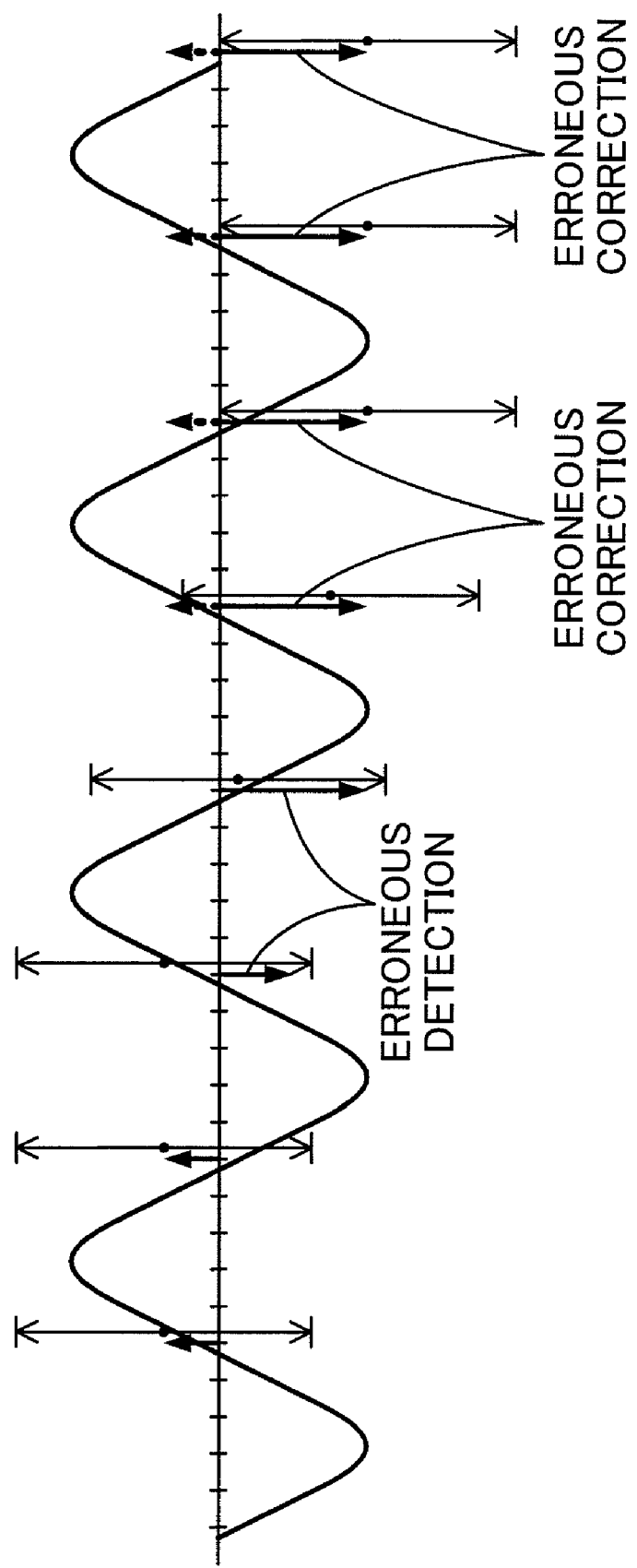
FIG. 7 is a comparative explanatory diagram showing a state in which a phase error is corrected erroneously.

In a case of employing a correcting method by which a degree of a correction phase error becomes larger than a degree of a phase error, consideration must be made to lopsided fixation of a phase error detection range (a state in which a phase error detection range is fixed at only a phase advance range or only a phase delay range). For example, in a case of employing a correcting method of determining a phase error detection range having a center obtained from an average value of past two phase errors, and setting a predetermined degree at 180°, no frequency error occurs as shown in FIG. 7 and a phase advance is generated constantly. In this state, when a phase error in a delay direction is erroneously and continuously detected because of an influence of noise, there is a possibility that a phase error to be generated later is erroneously corrected continuously. This disadvantage occurs because the phase error detection range is fixed at one side (i.e., the phase error detection range is fixed to only either the phase advance range or the phase delay range).

Figure 8:
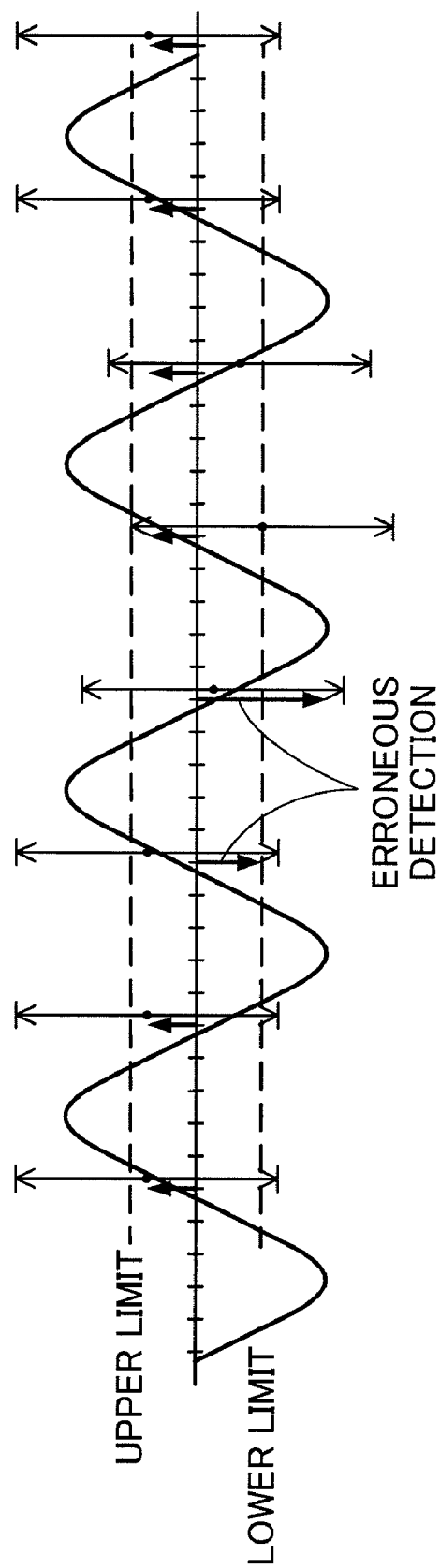
FIG. 8 is an explanatory diagram showing yet another example of phase error correction to be performed by the phase error correction section, according to the first embodiment of the present invention.

In order to prevent the lopsided fixation of the phase error detection range, it is preferable that the center value of the phase error detection range controlled by the detection range control section 30 has at least an upper limit or a lower limit. As shown in FIG. 8, for example, the upper limit of +90° and the lower limit of −90° are set for the center value of the phase error detection range. As a result, the lopsided fixation shown in FIG. 7 does not occur, and erroneous correction can be prevented. It should be noted that the upper and lower limits to be set for the center value of the phase error detection range are not limited to ±90°. However, in a case where the predetermined degree is 180°, it is desirable that the upper and lower limits to be set for the center value of the phase error detection range are less than ±180° in order to prevent the lopsided fixation of the phase error detection range.

Figure 9:
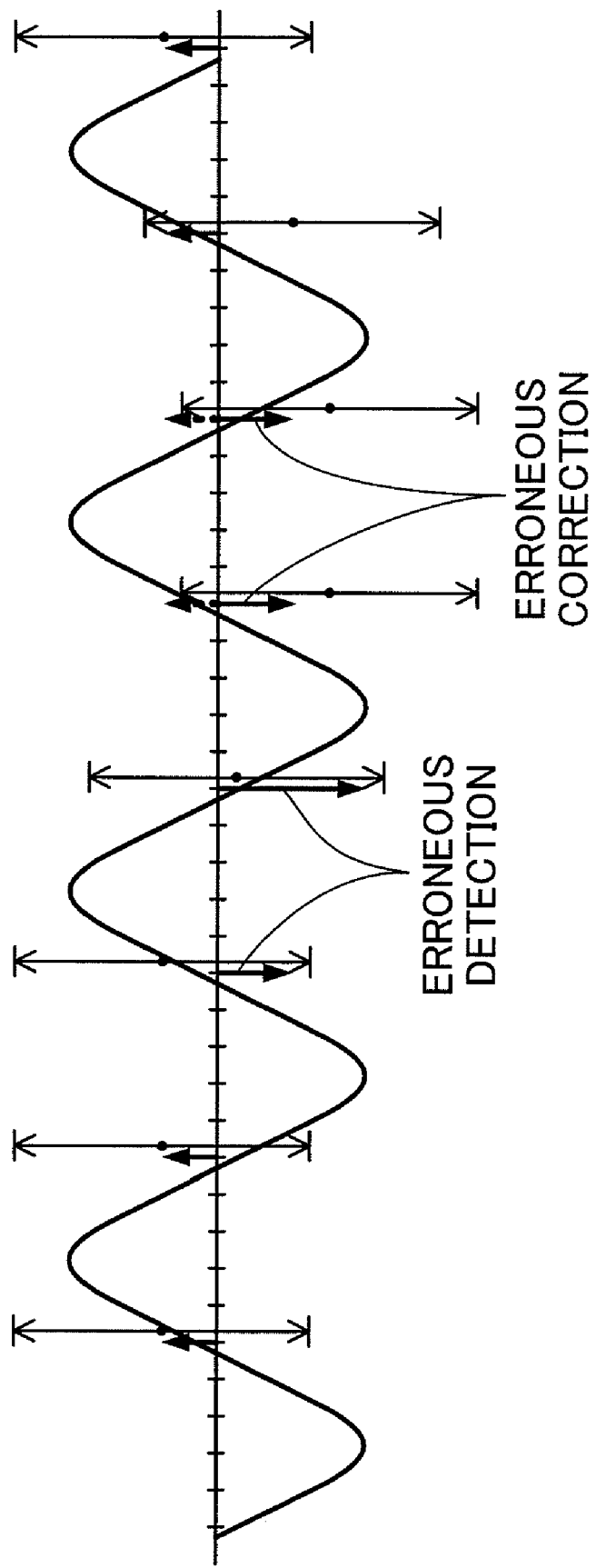
FIG. 9 is an explanatory diagram showing yet another example of phase error correction to be performed by the phase error correction section, according to the first embodiment of the present invention.

As shown in FIG. 9, the lopsided fixation can also be prevented when the predetermined degree of the correction value is 90°. It should be noted that the predetermined degree of the correction value is not limited to 90°. However, it is desirable that the predetermined degree of the correction value is less than 180° in order to prevent the lopsided fixation of the phase error detection range.

In the foregoing exemplary description according to the present embodiment, the center value of the phase error detection range is the average value of the past two or three phase errors or correction phase errors; however, any other methods may be employed as long as such a center value can be obtained from a value based on a phase error. For example, the center value of the phase error detection range may be a preceding phase error value. Alternatively, the center value of the phase error detection range may be a weighted average of past "n" phase errors (or correction phase errors). Still alternatively, the center value of the phase error detection range may be estimated using an approximate straight line obtained from past some phase errors.

Figure 10:
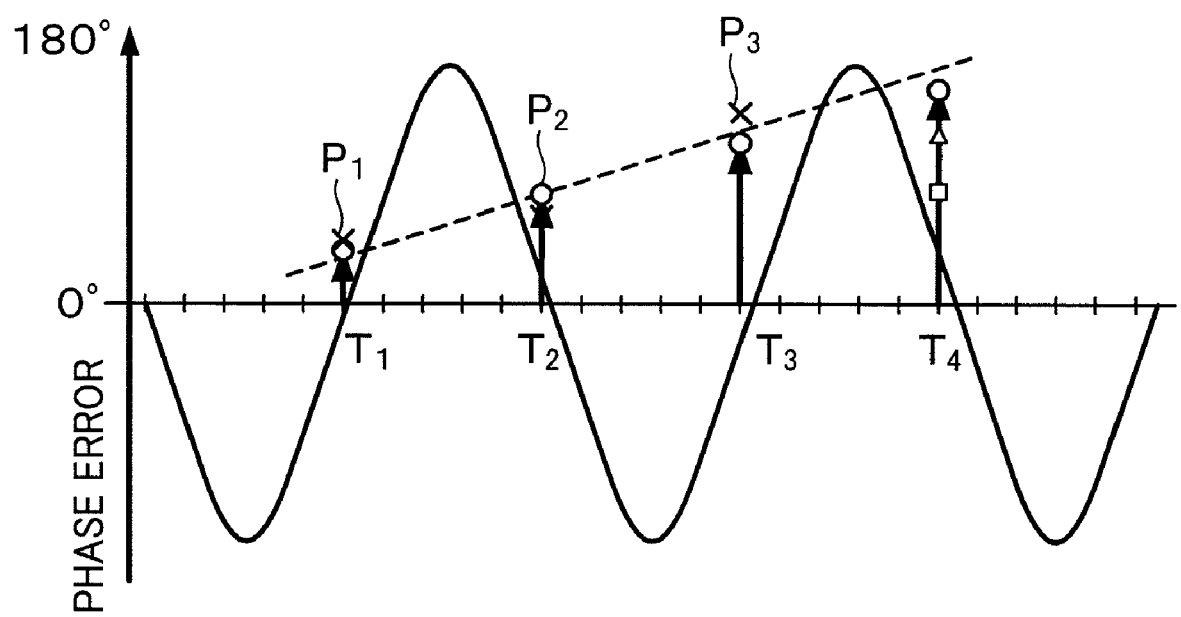
FIG. 10 is an explanatory diagram showing one example of a method for estimating a phase error detection range, according to the first embodiment of the present invention.
Figure 11:
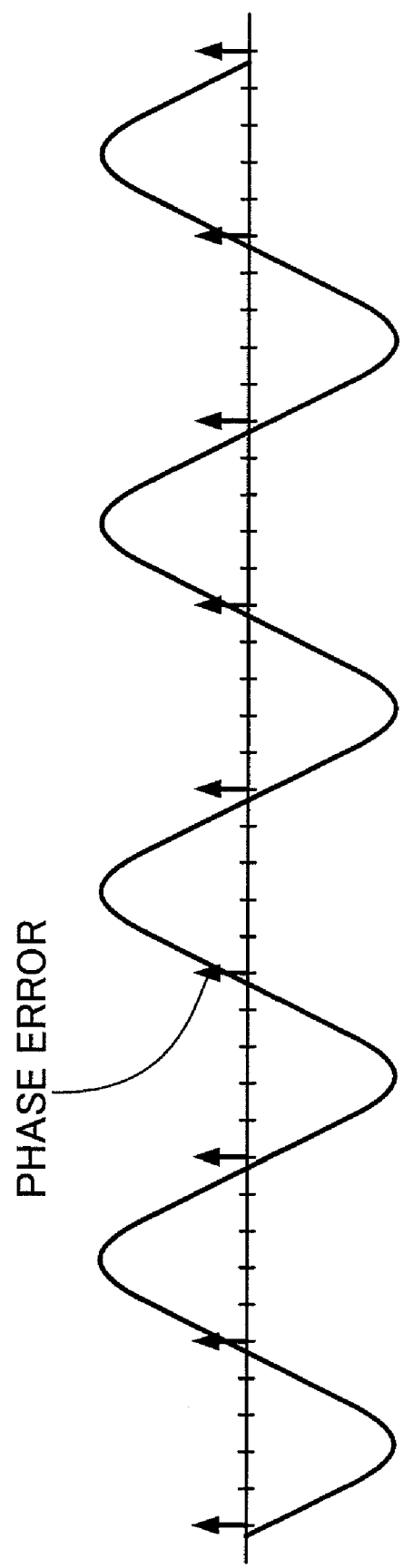
FIG. 11 is an explanatory diagram showing phase error detection to be performed in a state in which no frequency error occurs.

One example of a method for estimating the center value of the phase error detection range according to the present embodiment will be described below in detail with reference to FIG. 10. FIG. 10 shows a state in which a frequency deviation occurs at a 5T single signal. In FIG. 10, circle marks indicate ideal phase errors at times $T_1$ through $T_4$, and cross marks ($P_1$ through $P_3$) indicate phase errors detected at the times $T_1$ through $T_3$. At the times $T_1$, $T_2$, $T_3$ and $T_4$, the ideal phase errors are 39°, 78°, 117° and 156°. The detected phase errors $P_1$, $P_2$ and $P_3$ are 54°, 66° and 144°. The phase error at the time $T_4$ is estimated using an average value of the phase errors $P_1$ through $P_3$. As a result, the phase error at the time $T_4$ is 88° (a rectangle mark in FIG. 10).

As shown in FIG. 10, in the state in which the frequency deviation occurs, the difference between the ideal phase errors becomes larger as the interval between the times becomes larger. More specifically, the phase error $P_2$ becomes closer to the ideal phase error at the time $T_4$ as compared with the phase error $P_1$, and the phase error $P_3$ becomes closer to the ideal phase error at the time $T_4$ as compared with the phase error $P_2$. Therefore, a weighted average value may be obtained in such a manner that as a phase error is close to the ideal phase error at the time $T_4$, a weight to be put thereon is made larger. For example, a weighted average value in a relation of $P_1: P_2: P_3=1:2:4$ is 127° (a triangle mark in FIG. 10) which is close to the ideal phase error. This weighted average value obtained as described above is set at the center value of the phase error detection range.

It is also preferable that an approximate straight line (a broken line in FIG. 10) is obtained from the phase errors $P_1$ through $P_3$, based on time information, and a phase error is obtained from the approximate straight line. The value obtained in this case is close to the ideal phase error, and is 178° in the example shown in FIG. 10. The value obtained based on the approximate straight line is set at the center value of the phase error detection range. In the foregoing exemplary description according to the present embodiment, the approximate straight line is obtained from the past three phase errors $P_1$ through $P_3$; however, the present invention is not limited thereto. Alternatively, the center value of the phase error detection range may be determined in accordance with an approximate straight line obtained from past three or more phase errors.

It is preferable that the phase error detection section 2 generates the phase error from a plurality of digital reproduction signals. This configuration allows improvement in SN ratio.

It should be noted that the upper and lower limits for the center value of the phase error detection range may be changed in response to a frequency error. In a case where a frequency error occurs, a large phase error and a small phase error are detected periodically. This period becomes short as the frequency error is large. In the state shown in FIG. 2 in which the frequency error occurs, for example, the variation of phase errors to be detected is large. In the state shown in FIG. 11 in which no frequency error occurs, on the other hand, the variation of phase errors to be detected is small. Therefore, when a distribution value of phase errors during a predetermined period becomes equal to or less than a predetermined value, it can be estimated that the frequency error becomes small. For this reason, it is preferable that when the frequency error is large, the upper and lower limits for the center value of the phase error detection range are set to become large, and a period during which a phase advance/delay can be detected accurately is made long. On the other hand, it is preferable that when the frequency error is small, the upper and lower limits for the center value of the phase error detection range are set to become small, and occurrence of lopsided fixation is prevented. Thus, it is possible to configure a stable PLL section having a short pull-in time.

The frequency error rate may be estimated by any other methods. An example of an optical disc system shown in FIG. 12 will be described.

Figure 12:
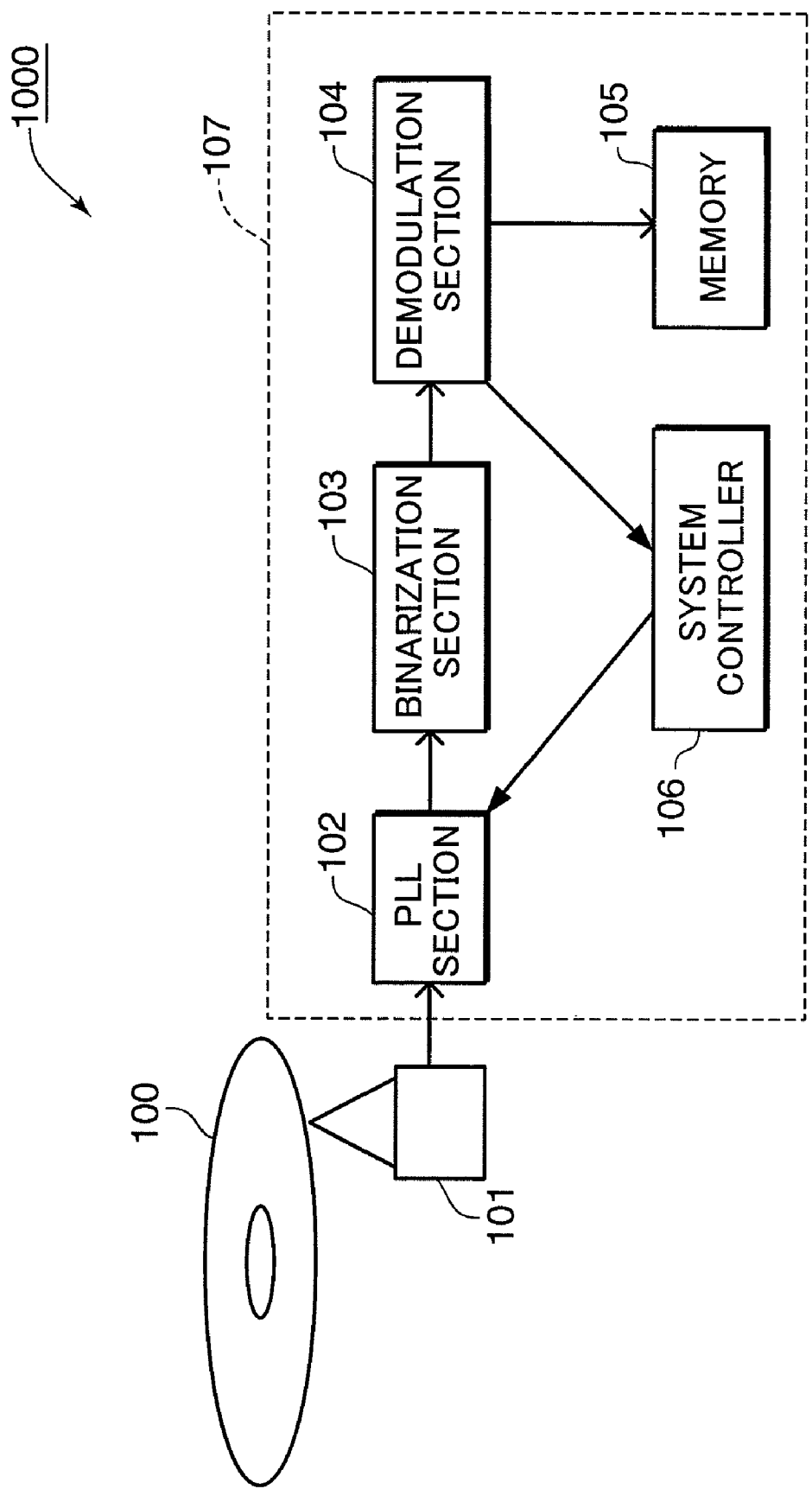
FIG. 12 is a block diagram showing one configuration example of an optical disc system, according to one embodiment of the present invention.

FIG. 12 is a block diagram showing one example of a configuration of the optical disc system according to the present embodiment. As shown in FIG. 12, the optical disc system 1000 according to the present embodiment includes an optical head section (optical pickup) 101 and a data reproduction section 107. The data reproduction section 107 includes a PLL section 102, a binarization section 103, a demodulation section 104, a memory 105 and a system controller 106.

The optical head section 101 reads out information from an information recording medium 100 to generate an analog reproduction signal. More specifically, the optical head section 101 irradiates the information recording medium 100 with laser light, and outputs an analog reproduction signal by converting, into a voltage, an amount of light reflected from the information recording medium 100.

The PLL section 102 outputs a digital reproduction signal by sampling the analog reproduction signal, based on a clock brought into synchronization with the analog reproduction signal. This PLL section 102 corresponds to the PLL section 100 described above.

The binarization section 103 generates a binarization signal from the digital reproduction signal, and outputs the binarization signal. The binarization section 103 may be, for example, a Viterbi decoder that decodes a reproduction signal subjected to PR (Partial Response) equalization to output binarization data by a maximum likelihood decoding method for estimating a most likely sequence, based on a symbol rule added intentionally in accordance with a type of PR characteristics.

The demodulation section 104 controls a timing, based on a synchronization signal contained in the binarization signal output from the binarization section 103, demodulates the binarization signal, and outputs information recorded in the information recording medium 101. The memory 105 holds the reproduction information output from the demodulation section 104. The system controller 106 controls the series of operations described above.

The synchronization signal contained in the binarization signal has predetermined binary synchronization patterns repeated at predetermined intervals. When a frequency error occurs at a clock and a reproduction signal in the PLL section 102, the demodulation section 104 fails to detect the synchronization pattern or detects the synchronization pattern which deviates from the interval between the synchronization patterns or the predetermined interval. Therefore, the system controller 106 monitors the interval between the synchronization patterns detected by the demodulation section 104. When the synchronization pattern can not be detected at the predetermined intervals, the system controller 106 increases the values of the upper and lower limits for the center value of the phase error detection range in the PLL section 102. On the other hand, when the synchronization pattern is detected at the predetermined intervals, the system controller 106 decreases the values of the upper and lower limits for the center value of the phase error detection range in the PLL section 102.

It should be noted that the method for correcting the phase error may be changed without changing the upper and lower limits for the center value of phase error detection range. As the degree of the phase error after being subjected to correction becomes larger than the degree of the phase error before being subjected to correction, the period during which the phase advance/delay can be detected accurately can be made longer. On the other hand, as the degree of the phase error after being subjected to correction approaches the degree of the phase error before being subjected to correction, the occurrence of lopsided fixation can be prevented.

The data reproduction section 107 may be realized as an integrated circuit, i.e., an LSI (Large Scale Integration). The data reproduction section 107 is divided into a plurality of blocks. Herein, each block may be formed as one chip using a semiconductor device such as an LSI. Alternatively, part of the blocks or all the blocks may be integrated into one chip.

The data reproduction section 107 may be mounted as a semiconductor device. In addition, the data reproduction section 107 may be realized in cooperation with memory devices such as a ROM and a RAM and a computing device such as a CPU. In this case, the ROM previously stores therein a program for allowing the demodulation section 104 to control the timing, based on the synchronization signal contained in the binarization signal to demodulate the binarization signal, and the CPU executes the program stored in the ROM. Moreover, the RAM reads therein a program for allowing the PLL section to compute the phase error, and the CPU executes the program read in the RAM.

Herein, the integrated circuit is referred to as an LSI. However, the integrated circuit may also be referred to as an IC, an LSI, a super LSI or an ultra LSI, depending on a difference in integration degree.

Moreover, the integrated circuit according to the present invention is not limited to an LSI, but may be realized using an exclusive-use circuit or a general purpose processor. Further, the integrated circuit may be configured using an FPGA (Field Programmable Gate Array) that can be programmed after fabrication of an LSI or a reconfigurable processor in which connections and settings of circuit cells inside an LSI are reconfigurable.

Further, when a circuit integration technique that replaces an LSI becomes available owing to advancement in a semiconductor technology or other derivative techniques, it goes without saying that functional blocks can be integrated using this technique. For example, biotechnologies have a potential of such application.

The integrated circuit may be realized as an integrated circuit also in respective configurations according to second through fourth embodiments to be described later.

Second Embodiment

A second embodiment of the present invention will be described below with reference to FIG. 13 through FIG. 15.

In the present embodiment, one example of a phase error detecting method to be used in the present invention will be described.

Figure 13:
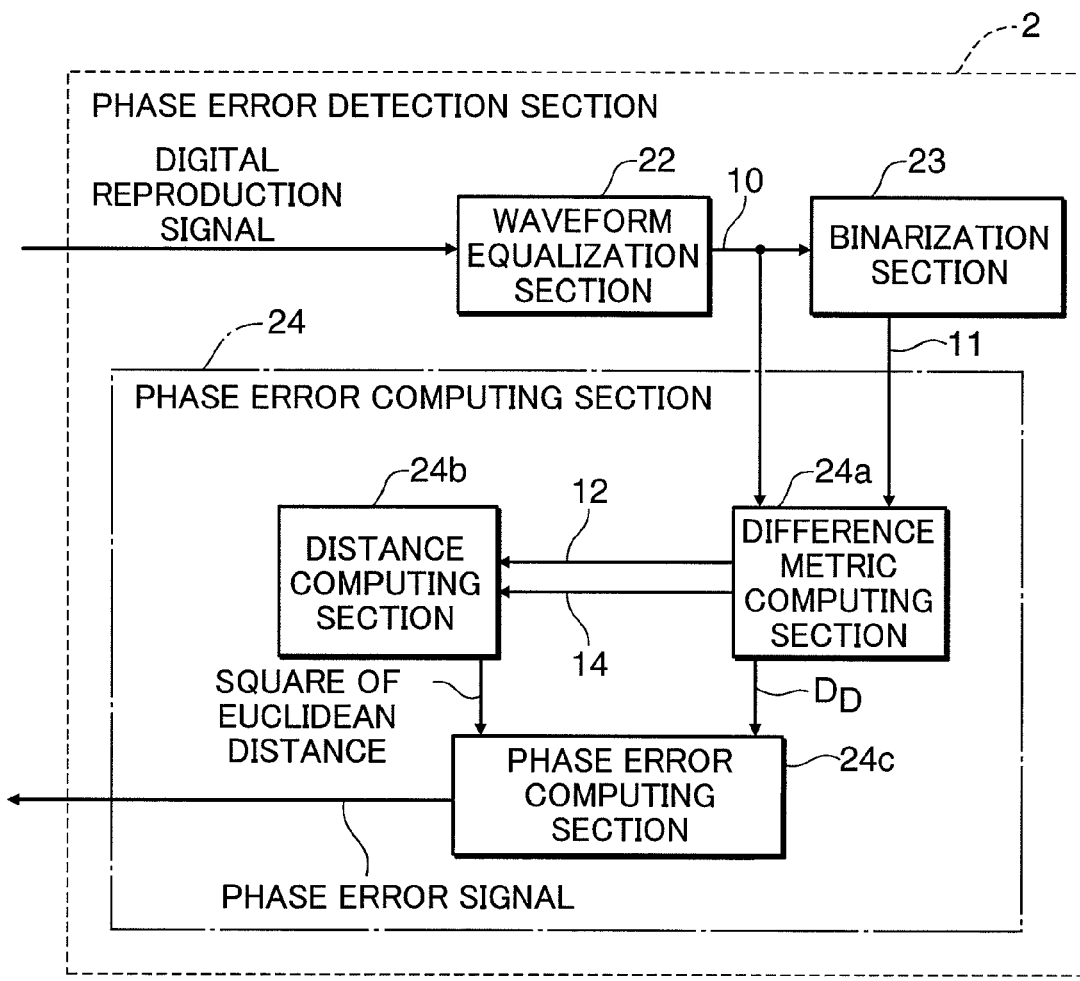
FIG. 13 is a block diagram showing a schematic configuration of a PLL section, according to a second embodiment of the present invention.

FIG. 13 is a block diagram showing a configuration of a phase error detection section 2 (also see FIG. 1) according to the present embodiment. As shown in FIG. 13, the phase error detection section 2 includes a waveform equalization section 22, a binarization section 23 and a phase error computing section 24.

The waveform equalization section 22 equalizes a waveform of a digital reproduction signal generated by an A/D conversion section 1 (see FIG. 1) to generate a digital equalization signal 10. In the present embodiment, the waveform equalization section 22 generates the digital equalization signal 10 by equalizing the digital reproduction signal such that the digital equalization signal 10 has a PR (1, 2, 2, 2, 1) equalization characteristic. It should be noted that the equalization characteristic is not limited to PR (1, 2, 2, 2, 1), and an arbitrary equalization characteristic may be applied in accordance with a recording capacity of a recording medium, and the like.

The binarization section 23 generates a binarization signal 11 from the digital equalization signal generated by the waveform equalization section 22. The phase error computing section 24 generates a phase error signal from the digital equalization signal 10 and the binarization signal 11.

The phase error computing section 24 includes a difference metric computing section 24a, a distance computing section 24b and a phase error computing section 24c.

The difference metric computing section 24a generates an ideal reproduction signal 12 from the binarization signal, based on the equalization characteristic of the waveform equalization section 22, and calculates a first metric between the digital equalization signal 10 and the ideal reproduction signal 12. Moreover, the difference metric computing section 24a generates an ideal comparison signal 14 from a comparison signal 13 obtained by shifting a rising edge or a falling edge of the binarization signal 11 by one time, based on the equalization characteristic, and calculates a second metric between the digital equalization signal 10 and the ideal comparison signal 14. Further, the difference metric computing section 24a computes a difference metric which is a difference between the first metric and the second metric. The distance computing section 24b calculates a value which is a square of an Euclidean distance between the ideal reproduction signal 12 and the ideal comparison signal 14. The phase error computing section 24c calculates a phase error from a difference between the difference metric and the square value of the Euclidean distance.

Figure 14:
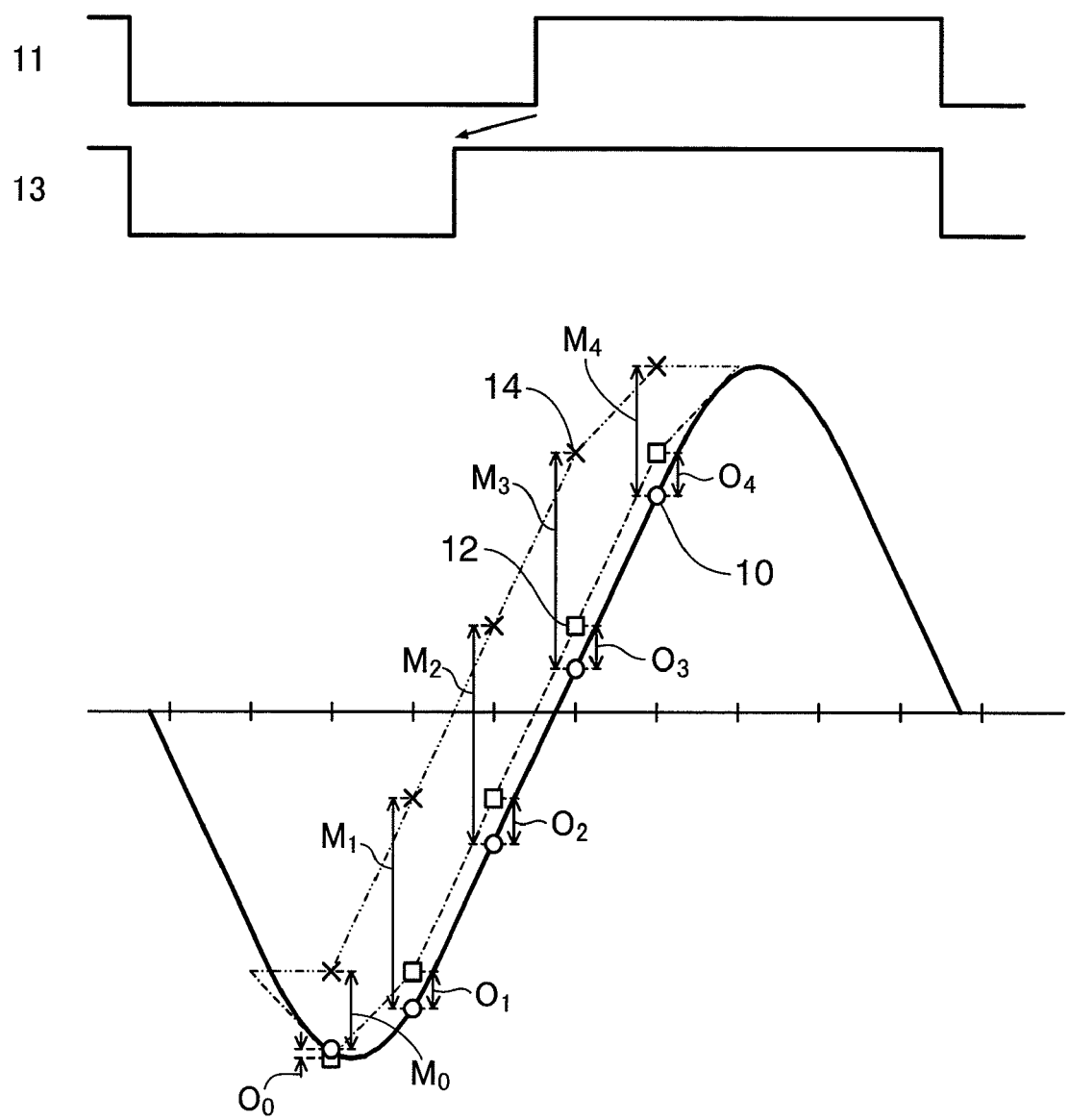
FIG. 14 is an explanatory diagram for explaining one example of a procedure for generating a phase error, according to the second embodiment of the present invention.
Figure 15:
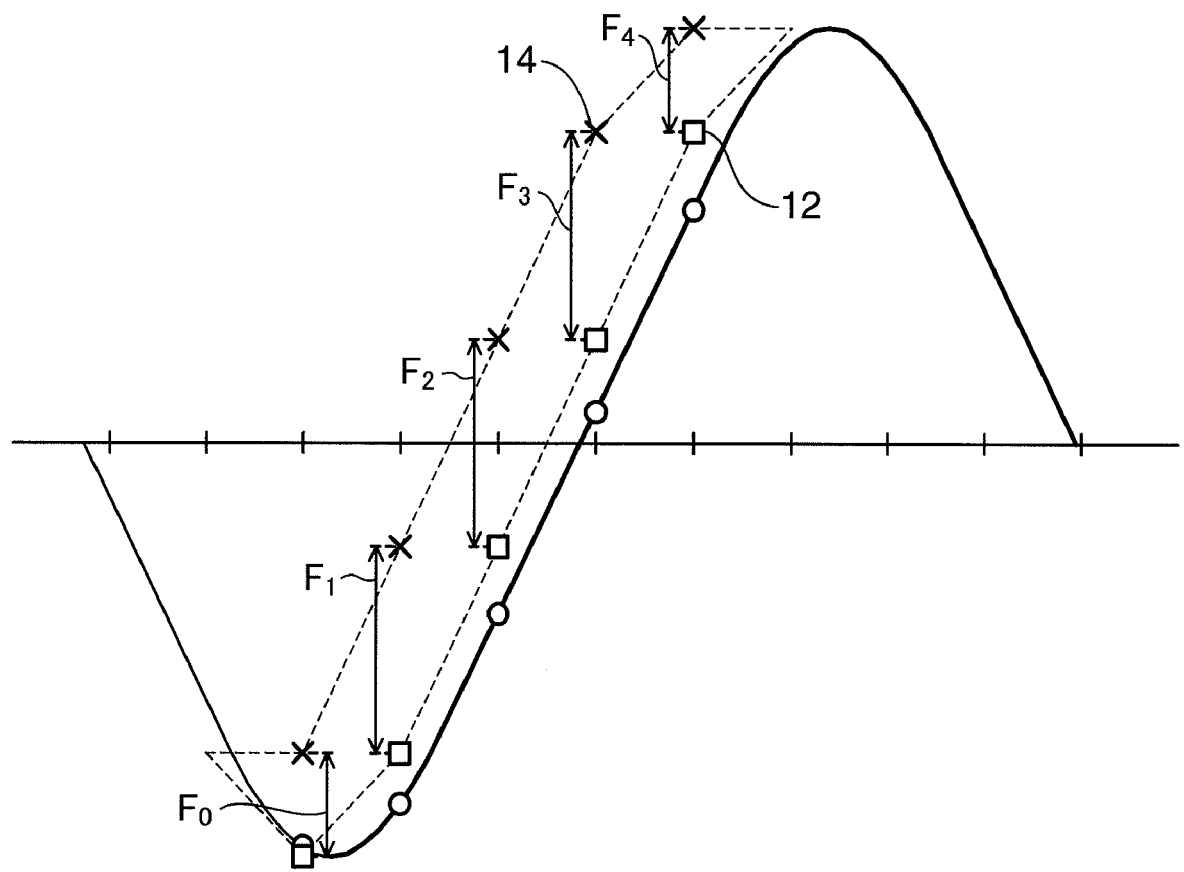
FIG. 15 is an explanatory diagram showing one example of a method for calculating a distance between an ideal reproduction signal and an ideal comparison signal, according to the second embodiment of the present invention.

FIG. 14 is a diagram for explaining a procedure for generating a phase error in a case where a comparison signal 13 obtained by shifting an edge of a binarization signal 11 to one clock earlier is used as a target to be compared. In FIG. 14, reference numerals 10, 11, 12, 13 and 14 denote a digital equalization signal, a binarization signal, an ideal reproduction signal, a comparison signal and an ideal comparison signal, respectively. FIG. 15 is a diagram for explaining a method for calculating a distance between the ideal reproduction signal 12 and the ideal comparison signal 14 (a square of a Euclidean distance between the ideal reproduction signal 12 and the ideal comparison signal 14). FIG. 14 and FIG. 15 each show a state in which a phase of a clock advances relative to the digital equalization signal 10.

First, operations of the phase error computing section 24 that generates a phase error by use of the comparison signal 13, which is obtained by shifting the edge of the binarization signal 11 to one clock earlier, as a target to be compared will be described with reference to FIG. 14 and FIG. 15.

The difference metric computing section 24a obtains the ideal reproduction signal 12 from the binarization signal 11, based on the PR (1, 2, 2, 2, 1) equalization characteristic. Then, the difference metric computing section 24a obtains a metric $D_O$ (a first metric) between the digital equalization signal 10 and the ideal reproduction signal 12 from the following equation.

$$D_O = O_0^2 + O_1^2 + O_2^2 + O_3^2 + O_4^2 \quad (1)$$

In Equation (1), a relation of $O_n = B_n - A_n$ is satisfied, in which $A_n$ (n=0 through 4) represents a value of the digital equalization signal 10 and $B_n$ (n=0 through 4) represents a value of the ideal reproduction signal 12.

Moreover, the difference metric computing section 24a obtains the ideal comparison signal 14 from the comparison signal 13 obtained by shifting the edge of the binarization signal 11 to one clock earlier, based on the PR (1, 2, 2, 2, 1) equalization characteristic. Then, the difference metric computing section 24a obtains a metric $D_M$ (a second metric) between the digital equalization signal 10 and the ideal comparison signal 14 from the following equation.

$$D_M = M_0^2 + M_1^2 + M_2^2 + M_3^2 + M_4^2 \quad (2)$$

In Equation (2), a relation of $M_n = C_n - A_n$ is satisfied, in which $C_n$ (n=0 through 4) represents a value of the ideal comparison signal 14.

Based on these results, the difference metric computing section 24a obtains a difference metric $D_D$ from the following equation.

$$D_D = D_M - D_O \quad (3)$$

Further, the distance computing section 24b obtains a square $D_F$ of a Euclidean distance between the ideal reproduction signal 12 and the ideal comparison signal 14 from the following equation.

$$D_F = F_0^2 + F_1^2 + F_2^2 + F_3^2 + F_4^2 \quad (4)$$

The phase error computing section 24c obtains a phase error P from the following equation.

$$P = D_D - D_F \quad (5)$$

In the example shown in FIG. 14, when the value n is 1 through 4, a relation of $M_n = O_n + F_n$ is satisfied. On the other hand, when the value n is 0, a relation of $M_0 \cong F_0$ and a relation of $O_0 \cong 0$ are satisfied. Therefore, the phase error P takes a positive value.

Figure 16:
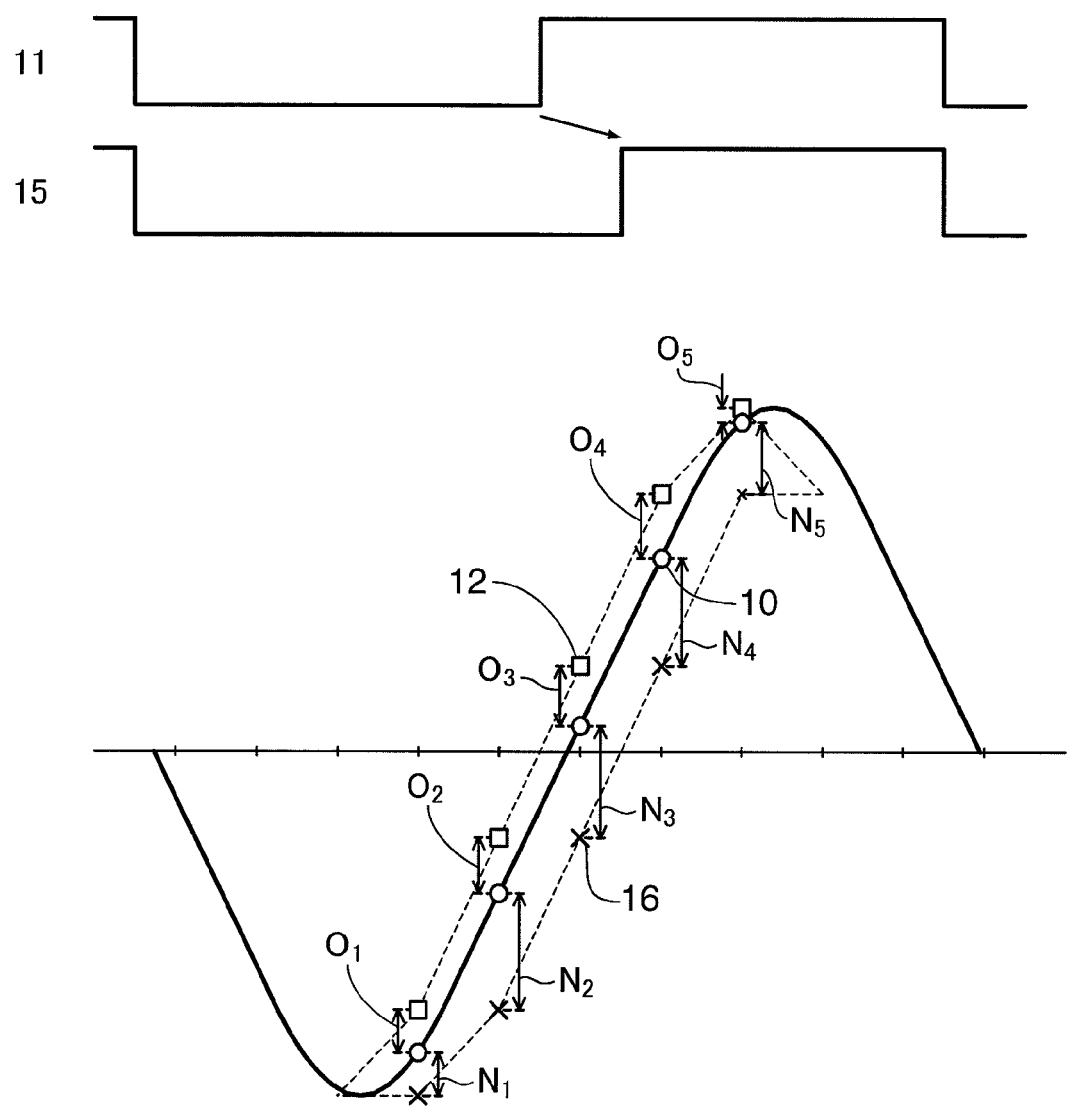
FIG. 16 is an explanatory diagram for explaining one example of a procedure for generating a phase error, according to a third embodiment of the present invention.
Figure 17:
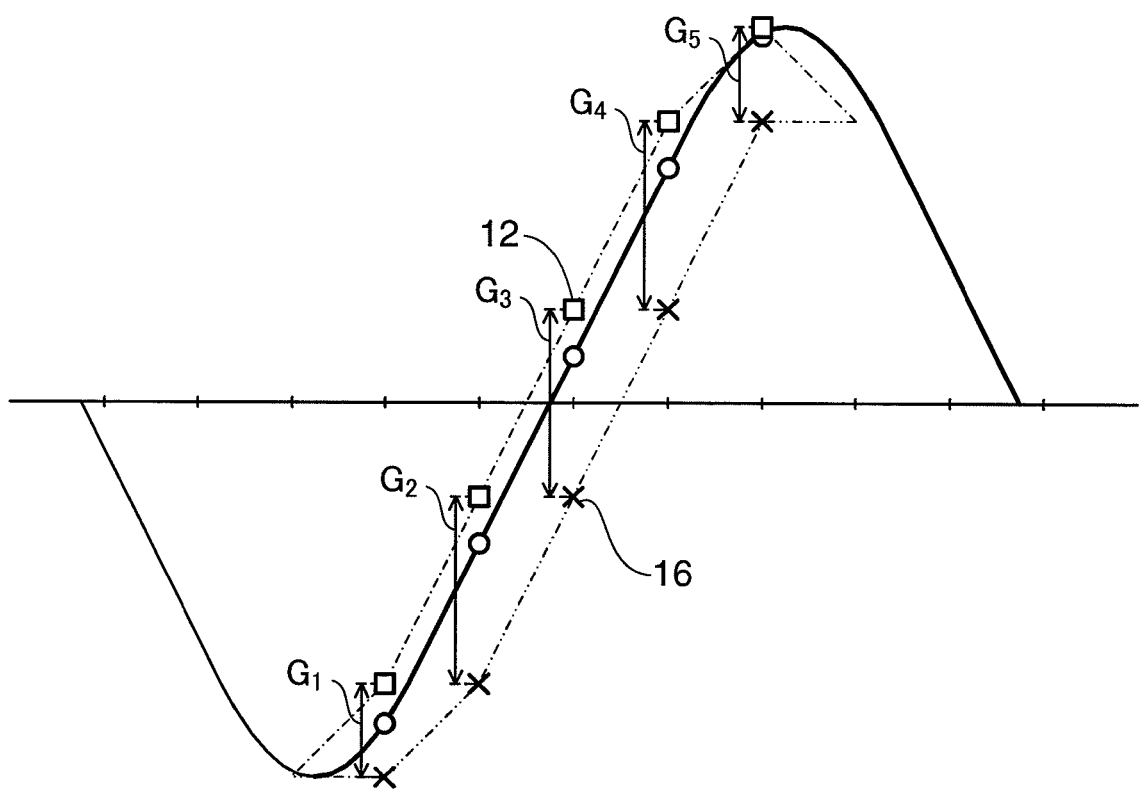
FIG. 17 is an explanatory diagram showing one example of a method for calculating a distance between an ideal reproduction signal and an ideal comparison signal, according to the third embodiment of the present invention.

Next, a procedure for generating a phase error by use of, as a target to be compared, a comparison signal 15 obtained by shifting the edge of the binarization signal 11 to one clock later will be described with reference to FIG. 16 and FIG. 17. FIG. 16 is a diagram for explaining the procedure for generating the phase error by use of, as the target to be compared, the comparison signal 15 obtained by shifting the edge of the binarization signal 11 to one clock later. In FIG. 16, reference numerals 10, 11, 12, 15 and 16 denote a digital equalization signal, the binarization signal, an ideal reproduction signal, the comparison signal and an ideal comparison signal, respectively. FIG. 17 is an explanatory diagram for explaining a method for calculating a distance between the ideal reproduction signal 12 and the ideal comparison signal 16. FIG. 16 and FIG. 17 each show a state in which a phase of a clock advances relative to the digital equalization signal 10.

The difference metric computing section 24a obtains the ideal reproduction signal 12 from the binarization signal 11, based on the PR (1, 2, 2, 2, 1) equalization characteristic. Then, the difference metric computing section 24a obtains a metric $D_o$ (a first metric) between the digital equalization signal 10 and the ideal reproduction signal 12 from the following equation.

$$D_O = O_1^2 + O_2^2 + O_3^2 + O_4^2 + O_5^2 \quad (6)$$

In Equation (6), a relation of $O_n = B_n - A_n$ is satisfied, in which $A_n$ (n=1 through 5) represents a value of the digital equalization signal 10 and $B_n$ (n=1 through 5) represents a value of the ideal reproduction signal 12.

Moreover, the difference metric computing section 24a obtains the ideal comparison signal 16 from the comparison signal 15 obtained by shifting the edge of the binarization signal 11 to one clock later, based on the PR (1, 2, 2, 2, 1) equalization characteristic. Then, the difference metric computing section 24a obtains a metric $D_N$ (a second metric) between the digital equalization signal 10 and the ideal comparison signal 16 from the following equation.

$$D_N = N_1^2 + N_2^2 + N_3^2 + N_4^2 + N_5^2 \quad (7)$$

In Equation (7), a relation of $N_n = C_n - A_n$ is satisfied, in which $D_n$, (n=1 through 5) represents a value of the ideal comparison signal 16.

Based on these results, the difference metric computing section 24a obtains a difference metric $D_D$ from the following equation.

$$D_D = D_N - D_O \quad (8)$$

Further, the distance computing section 24a obtains a square $D_G$ of a Euclidean distance between the ideal reproduction signal 12 and the ideal comparison signal 16 from the following equation.

$$D_G = G_1^2 + G_2^2 + G_3^2 + G_4^2 + G_5^2 \quad (9)$$

The phase error computing section 24c obtains a phase error P from the following equation.

$$P = D_D - D_G \quad (10)$$

In the example shown in FIG. 16, when the value n is 1 through 5, a relation of $G_n = O_n + N_n$ is satisfied. Therefore, the phase error P takes a negative value.

As in the detection value described above with reference to FIG. 14, in order to match the polarity such that each advancing phase error takes a positive value also in the case shown in FIG. 16, the sign of the phase error P obtained in the case shown in FIG. 16 must be inverted. More specifically, in the case where the phase error is generated using the comparison signal obtained by shifting the rising edge to one clock later, the sign of the calculated phase error is inverted, so that the advancing phase error takes a positive value.

In the foregoing exemplary description, the comparison signal is generated by shifting the rising edge of the binarization signal 11 to one clock earlier or one clock later. Likewise, a comparison signal may be generated by shifting the falling edge of the binarization signal 11 to one clock earlier or one clock later, and a phase error may be generated with respect to the falling of the binarization signal 11. As in the case where the phase error is generated with respect to the rising of the binarization signal 11, when the phase error is generated using a comparison signal obtained by shifting the falling edge to one clock later, the sign of the calculated phase error must be inverted. The phase error subjected to this sign adjustment is used finally.

As described above, the method according to the present embodiment allows generation of a phase error based on a binarization result and a digital equalization signal.

It should be noted that the calculation of the metric and the calculation of the square of the Euclidean distance between the ideal reproduction signal and the ideal comparison signal may be performed while some signals are omitted. For example, it is assumed herein that the value n shown in FIG. 14 is 1 through 3 and the value n shown in FIG. 16 is 2 through 4. In this state, a phase error may be obtained by calculation of each metric and calculation of a square of a Euclidean distance between an ideal reproduction signal and an ideal comparison signal.

If the calculated phase error exceeds ±180°, it is determined that the binarization signal has an error; therefore, the phase error may be made invalid. When an absolute value of a phase error is larger than a distance between an ideal reproduction signal and an ideal comparison signal, it can be determined that the phase error exceeds ±180°.

As a binarization signal to be generated by the binarization section 23 is less in error, a phase error can be detected more accurately. Use of Viterbi decoding in the binarization section 23 allows improvement in accuracy of a binarization signal.

Third Embodiment

A method for correcting a phase error according to a third embodiment of the present invention will be described below with reference to FIG. 18 through FIG. 21.

Figure 19:
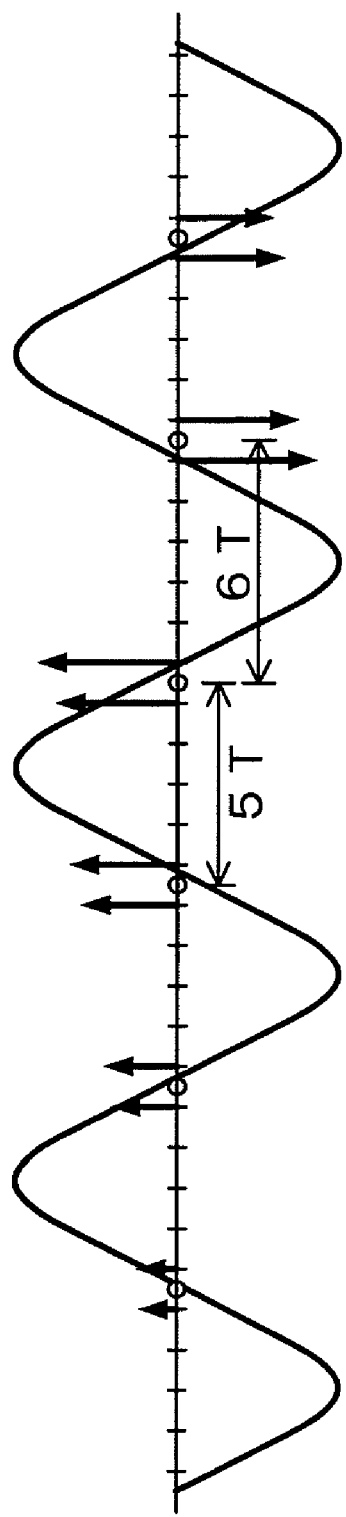
FIG. 19 is an explanatory diagram showing phase error detection to be performed in a case where binarization is performed erroneously.
Figure 20:
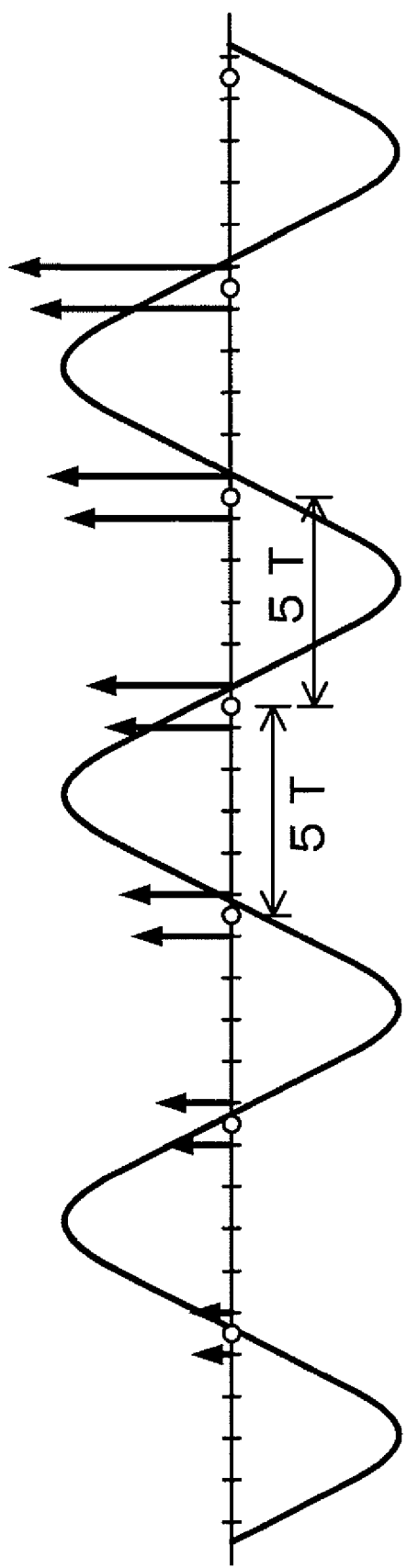
FIG. 20 is an explanatory diagram showing one example of phase error correction to be performed by a phase error correction section, according to the third embodiment of the present invention.

Erroneous binarization occurs at a portion where a polarity of a phase error is inverted. As shown in FIG. 19, for example, in a case where a clock to be generated by a clock generation section 56 is slightly higher in frequency than a 5T single signal, a result of binarization takes a value of 6T at the portion where the polarity of the phase error is inverted. As shown in FIG. 20, if the result of binarization is corrected to take a value of 5T, a phase advance can be detected continuously.

Figure 18:
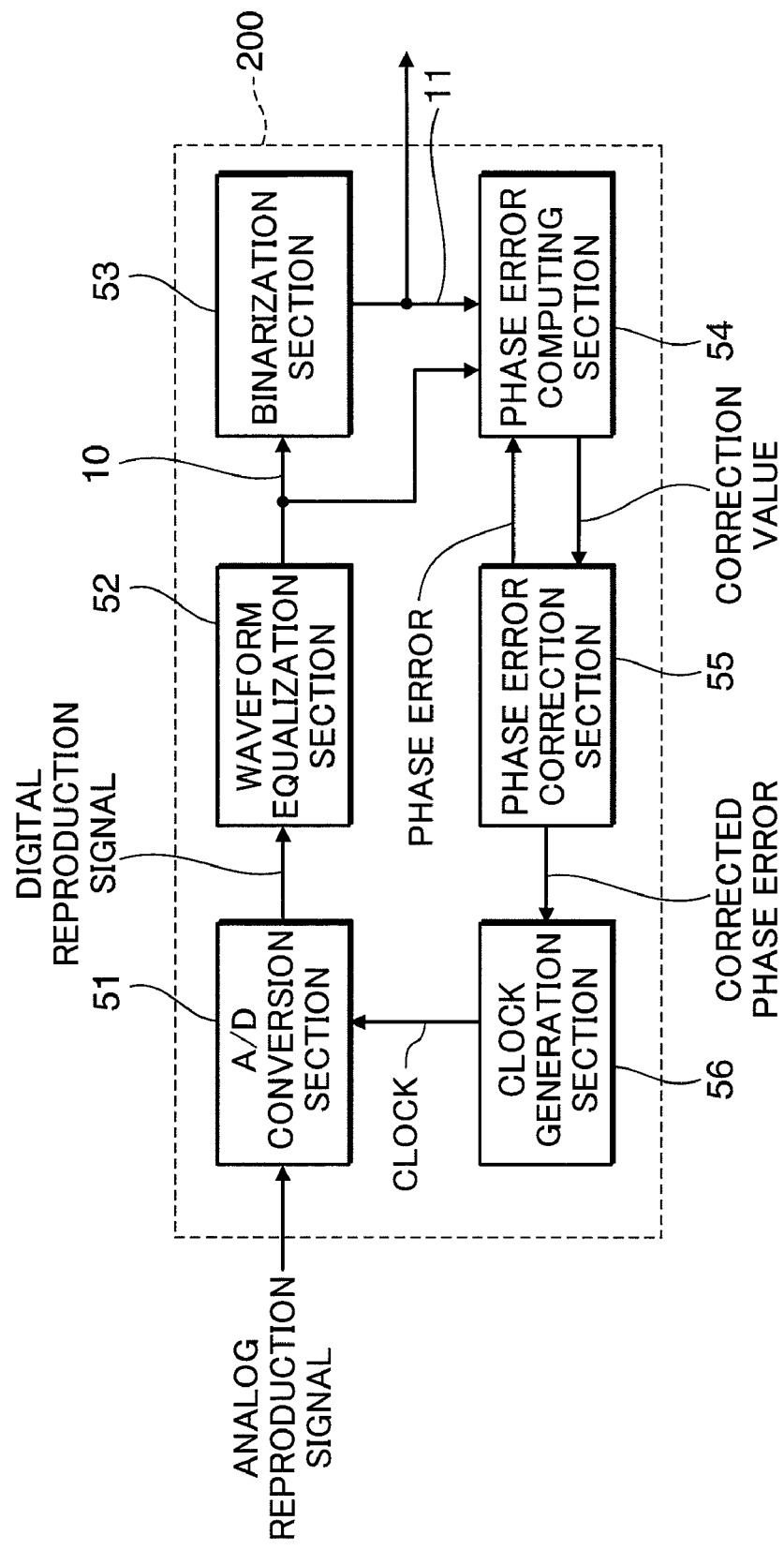
FIG. 18 is a block diagram showing one example of a schematic configuration of a PLL section, according to the third embodiment of the present invention.

FIG. 18 is a block diagram showing a configuration of a PLL section 200 according to the present embodiment. As shown in FIG. 18, the PLL section 200 according to the present embodiment includes an A/D conversion section 51, a waveform equalization section 52, a binarization section 53, a phase error computing section 54, a phase error correction section 55 and the clock generation section 56.

The A/D conversion section 51 performs A/D conversion on an analog reproduction signal to be input thereto, in accordance with a clock from the clock generation section 56 to generate a digital reproduction signal. The waveform equalization section 52 equalizes a waveform of the digital reproduction signal generated by the A/D conversion section 51 to generate a digital equalization signal, and outputs the digital equalization signal to the binarization section 53 and the phase error computing section 54. The binarization section 53 generates a binarization signal from the digital equalization signal generated by the waveform equalization section 52, and outputs the binarization signal to the phase error computing section 54. The phase error computing section 54 generates a phase error from the digital equalization signal generated by the A/D conversion section 51 and the binarization signal generated by the waveform equalization section 52, and outputs the phase error to the phase error correction section 55. The phase error correction section 55 determines whether the phase error generated by the phase error computing section 54 falls within a range determined from past phase errors. Then, when the phase error is out of the range, the phase error correction section 55 outputs a correction command signal to the phase error computing section 54. On the other hand, when the phase error is within the range, the phase error correction section 55 outputs the phase error to the clock generation section 56. The clock generation section 56 generates a clock in accordance with the phase error from the phase error correction section 55.

Moreover, when receiving the correction command signal from the phase error correction section 55, the phase error computing section 54 corrects the binarization signal from the binarization section 53 by shifting the rising or falling edge of the binarization signal by one time to generate a comparison signal, and regenerates the phase error using the comparison signal. It is desirable that the phase error computing section 54 regenerates the phase error using one of two comparison signals, which is smaller in difference metric than the other, regarding the binarization signal from the binarization section 53. Herein, one of the two comparison signals is obtained by shifting the rising or falling edge of the binarization signal to one clock earlier, and the other comparison signal is obtained by shifting the rising or falling edge of the binarization signal to one clock later.

Next, detailed operations of the phase error computing section 54 and those of the phase error correction section 55 will be described below with reference to FIG. 21.

Figure 21:
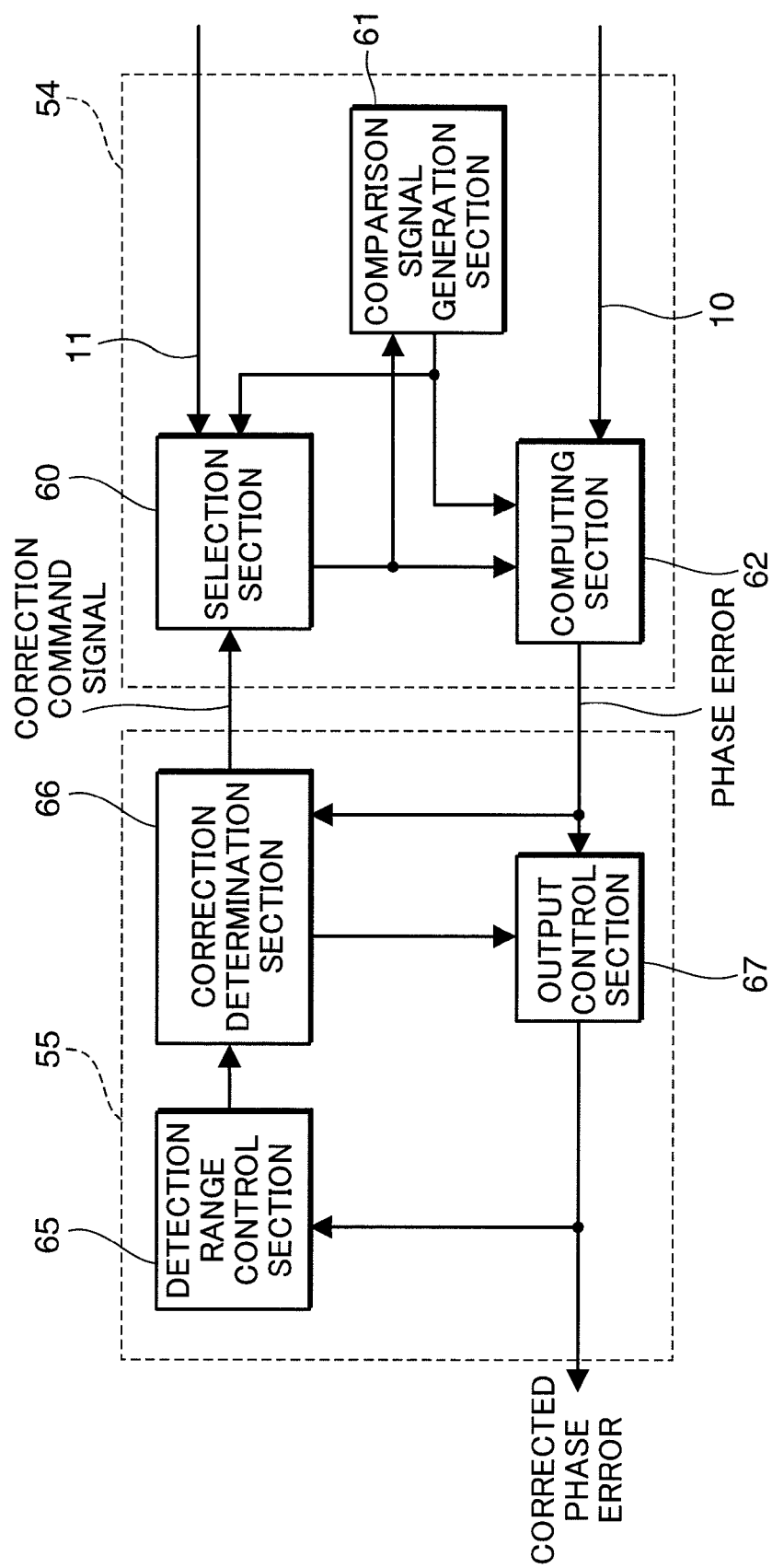
FIG. 21 is an explanatory diagram showing one configuration example of a phase error generation section and one configuration example of the phase error correction section, according to the third embodiment of the present invention.

As shown in FIG. 21, the phase error computing section 54 includes a selection section 60, a comparison signal generation section 61 and a computing section 62. Moreover, the phase error correction section 55 includes a detection range control section 65, a correction determination section 66 and an output control section 67.

When receiving a correction signal from the correction determination section 66, the selection section 60 outputs a comparison signal from the comparison signal generation section 61, as a selection binarization signal, to the comparison signal generation section 61 and the computing section 62. On the other hand, when receiving no correction signal from the correction determination section 66, the selection section 60 outputs a binarization signal from the binarization section 53, as a selection binarization signal, to the comparison signal generation section 61 and the computing section 62. In general, the binarization signal from the binarization section 53 is selected by the selection section 60.

The comparison signal generation section 61 shifts an edge of the selection binarization signal input thereto by the selection section 60 to one clock earlier and one clock later to generate two comparison signals. The computing section 62 generates a phase error from the selection binarization signal from the selection section 60, the comparison signal from the comparison signal generation section 61, and a digital equalization signal from the waveform equalization section 52. It should be noted that the computing section 62 may compute a phase error corresponding to each of the two comparison signals input thereto by the comparison signal generation section 61 to determine that a computing result of the phase error is accurate. However, the computing result of the phase error using one of the two comparison signals is generally identical with the computing result of the phase error using the other comparison signal; therefore, the computing section 62 may generate a phase error using only one of the two comparison signals. The phase error generated by the computing section 62 is input to the correction determination section 66 and the output control section 67.

The detection range control section 65 calculates an average value of past four correction phase errors output from the output control section 67, and sets a range of ±180° with respect to this average value as a phase error detection range. It should be noted that the method for determining the phase error detection range is not limited thereto. As described above, the center value of the phase error detection range may be obtained from an average or a weighted average of past "n" correction phase errors. Alternatively, the center value of the phase error detection range may be estimated using an approximate straight line obtained from past some correction phase errors.

The correction determination section 66 compares the phase error input thereto by the computing section 62 with the phase error detection range generated by the detection range control section 65. When the phase error is out of the phase error detection range, the correction determination section 66 outputs a correction command signal to the selection section 60. When receiving the correction command signal, the selection section 60 outputs the comparison signal as the selection binarization signal in order to correct the binarization signal. Herein, the selection section 60 may employ, as the selection binarization signal, the comparison signal corresponding to one of the two comparison signals, which is smaller in difference metric than the other, each input thereto by the comparison signal generation section 61.

When the selection section 60 outputs the comparison signal as the selection binarization signal, based on the correction command signal, the comparison signal generation section 61 regenerates the comparison signal as in the manner described above and, also, the computing section 62 regenerates the phase error as in the manner described above. Then, if the regenerated phase error is out of the phase error detection range, the correction determination section 66 outputs a stop signal to the output control section 67. This stop signal is used for preventing infinite loop of correction. If the regenerated phase error is out of the phase error detection range, recorrection is not performed.

The output control section 67 outputs the phase error from the computing section 62 as a correction phase error when receiving no stop signal, but outputs no correction phase error when receiving the stop signal.

As described above, the phase error, which is out of the phase error detection range, is corrected in such a manner that the binarization signal is corrected. Thus, an advancing phase error can be output in a wider section as shown in FIG. 20. Therefore, it is possible to realize stable PLL that allows phase synchronization even when a large frequency error occurs.

It should be noted that phase errors to be generated based on two comparison signals by the computing section 62 may be generated simultaneously. Alternatively, the phase error corresponding to the first comparison signal (one of the two comparison signals) may be generated first, and then the phase error corresponding to the second comparison signal (the other comparison signal) may be generated.

In a case where a comparison signal has a pattern which is shorter than the shortest pattern, it is preferable that a phase error is not generated in such a manner that the comparison signal is made invalid. In CDs/DVDs, for example, the shortest pattern takes a value of 3T. In BDs, on the other hand, the shortest pattern takes a value of 2T.

Fourth Embodiment

A method for correcting a phase error, according to a fourth embodiment of the present invention, will be described below with reference to FIG. 22.

Figure 22:
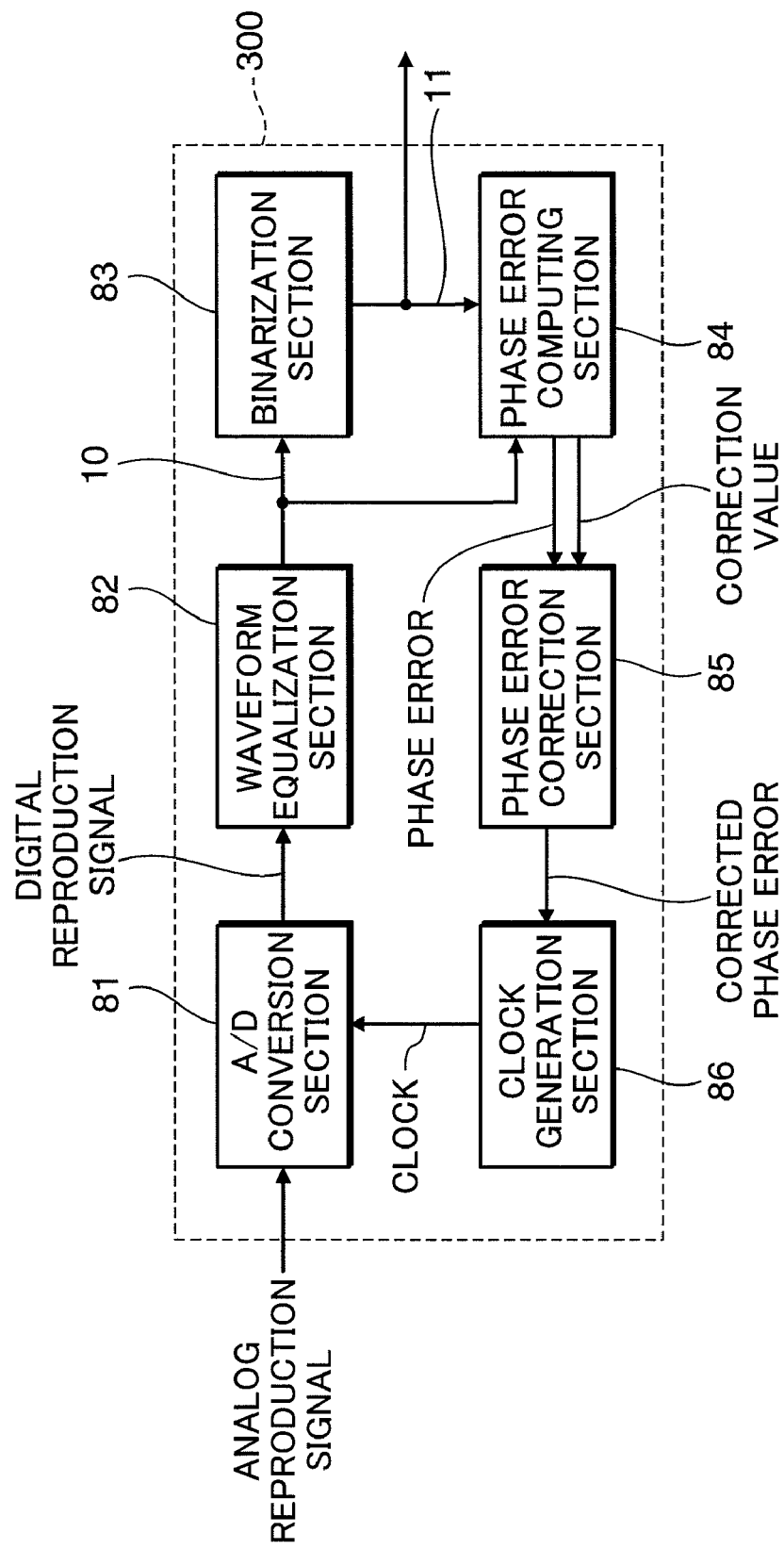
FIG. 22 is a block diagram showing one example of a schematic configuration of a PLL section, according to a fourth embodiment of the present invention.

FIG. 22 is a block diagram showing a schematic configuration of a PLL section 300 according to the present embodiment. As shown in FIG. 22, the PLL section 300 includes an A/D conversion section 81, a waveform equalization section 82, a binarization section 83, a phase error computing section 84, a phase error correction section 85 and a clock generation section 86.

The A/D conversion section 81 performs A/D conversion on an analog reproduction signal to be input thereto, in accordance with a clock from the clock generation section 86 to generate a digital reproduction signal, and outputs the digital reproduction signal to the waveform equalization section 82. The waveform equalization section 82 equalizes a waveform of the digital reproduction signal generated by the A/D conversion section 81 to generate a digital equalization signal, and outputs the digital equalization signal to the binarization section 83 and the phase error computing section 84. The binarization section 83 generates a binarization signal from the digital equalization signal generated by the waveform equalization section 82, and outputs the binarization signal to the phase error computing section 84.

The phase error computing section 84 generates a phase error from the digital equalization signal which is an input signal from the waveform equalization section 82 and the binarization signal which is an input signal from the binarization section 83, and outputs the phase error to the phase error correction section 85. In a case where a difference metric which is expressed by Equation (3) or (8) described above is equal to or less than a square of a Euclidean distance between an ideal reproduction signal and an ideal comparison signal, which is expressed by Equation (4) or (9) described above, further, the phase error computing section 84 outputs a correction value (which will be described later) to the phase error correction section 85.

The phase error correction section 85 determines whether the phase error generated by the phase error computing section 84 falls within a phase error detection range determined from past phase errors. It is assumed herein that the phase error is out of the phase error detection range. In such a case, if receiving the correction value, the phase error correction section 85 outputs the correction value as a correction phase error to the clock generation section 86. In the same case, on the other hand, if receiving no correction value, the phase error correction section 85 makes the phase error invalid and outputs no correction phase error to the clock generation section 86. In a case where the phase error is within the phase error detection range, the phase error correction section 85 outputs the phase error as a correction phase error to the clock generation section 86. The clock generation section 86 generates a clock in accordance with the correction phase error from the phase error correction section 85 to output the clock to the A/D conversion section 81.

According to the present embodiment, as described above, in the case where the phase error generated by the phase error computing section 84 is out of the phase error detection range determined from the past phase errors, when the difference metric is equal to or less than the square of the Euclidean distance between the ideal reproduction signal and the ideal comparison signal, the phase error is corrected. On the other hand, when the difference metric is larger than the square of the Euclidean distance between the ideal reproduction signal and the ideal comparison signal, the phase error is made invalid.

Next, a correction value to be generated by the phase error computing section 84 will be described. A correction value $P_H$ is expressed by the following equation.

$$P_H = -D_D - D_F \quad (11)$$

In Equation (11), $D_D$ represents a difference metric, and $D_F$ represents a square of a Euclidean distance between an ideal reproduction signal and an ideal comparison signal. That is, as will be apparent from Equation (5) described above, the operation of computing the correction value $P_H$ from Equation (11) is equal to the operation of regenerating a phase error by inverting a sign of the difference metric $D_D$.

Moreover, if a phase error P before being subjected to sign adjustment, which is expressed by Equation (5) or (10) described above, is known previously, the correction value $P_H$ can also be expressed by the following equation.

$$P_H = P - 2D_F \quad (12)$$

In either the case using Equation (11) or the case using Equation (12), it is preferable that the correction value $P_H$ is opposite in sign to the phase error P.

Next, correction to be performed by the phase error correction section 85 will be described with reference to FIG. 23.

Figure 23:
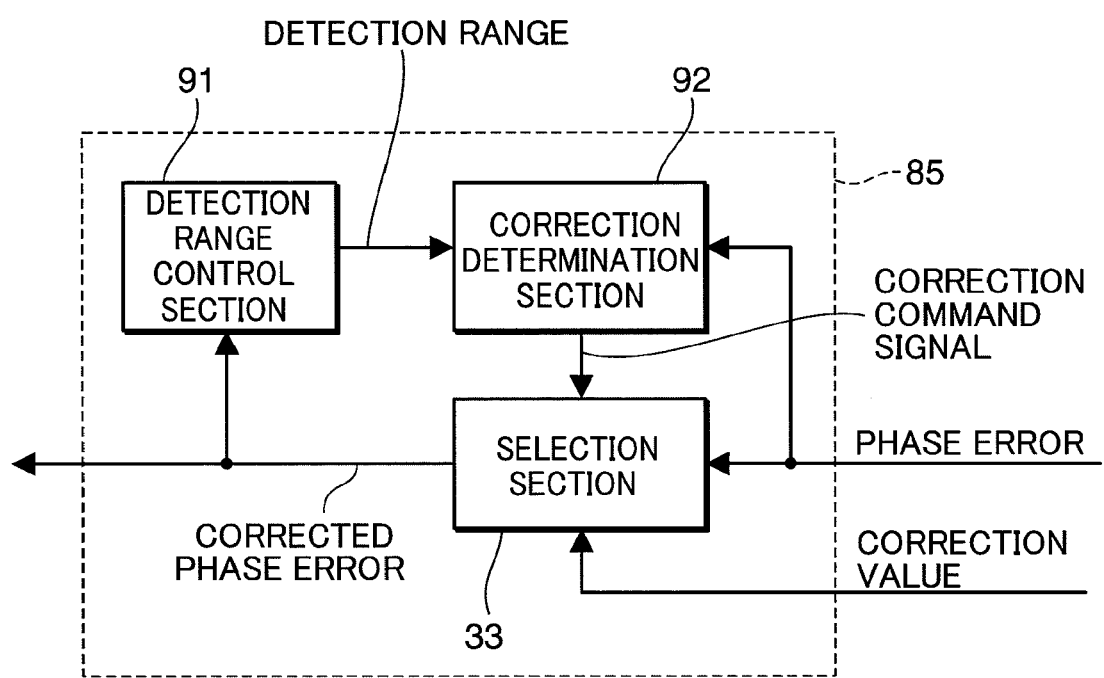
FIG. 23 is a block diagram showing one configuration example of a phase error correction section, according to the fourth embodiment of the present invention.

FIG. 23 shows a schematic configuration of the phase error correction section 85. As shown in FIG. 23, the phase error correction section 85 includes a detection range control section 91, a correction determination section 92 and a selection section 93.

The detection range control section 91 calculates an average value of past four correction phase errors output from the selection section 93, and sets a range of ±180° with respect to this average value as a phase error detection range. It should be noted that the method for determining the phase error detection range is not limited thereto. As described above, the center value of the phase error detection range may be obtained from an average or a weighted average of past "n" correction phase errors. Alternatively, the center value of the phase error detection range may be estimated using an approximate straight line obtained from past some correction phase errors.

The correction determination section 92 compares the phase error input thereto by the phase error computing section 84 with the phase error detection range generated by the detection range control section 91. When the phase error is out of the phase error detection range, the correction determination section 92 outputs a correction command signal to the selection section 93. In a case of receiving the correction command signal from the correction determination section 92, the selection section 93 outputs a correction value as a correction phase error to the clock generation section 86. Otherwise, the selection section 93 outputs the phase error as a correction phase error to the clock generation section 86. However, even when receiving the correction command signal from the correction determination section 92, the selection section 93 outputs no correction phase error unless receiving the correction value from the phase error computing section 84.

Figure 24:
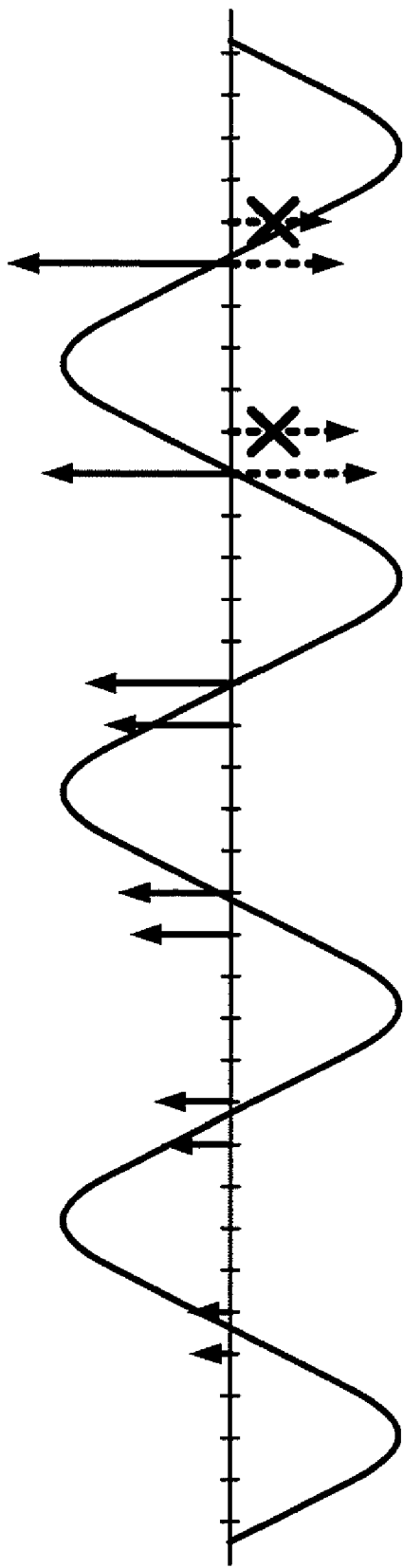
FIG. 24 is an explanatory diagram showing one example of phase error correction to be performed by the phase error correction section, according to the fourth embodiment of the present invention.
Figure 25:
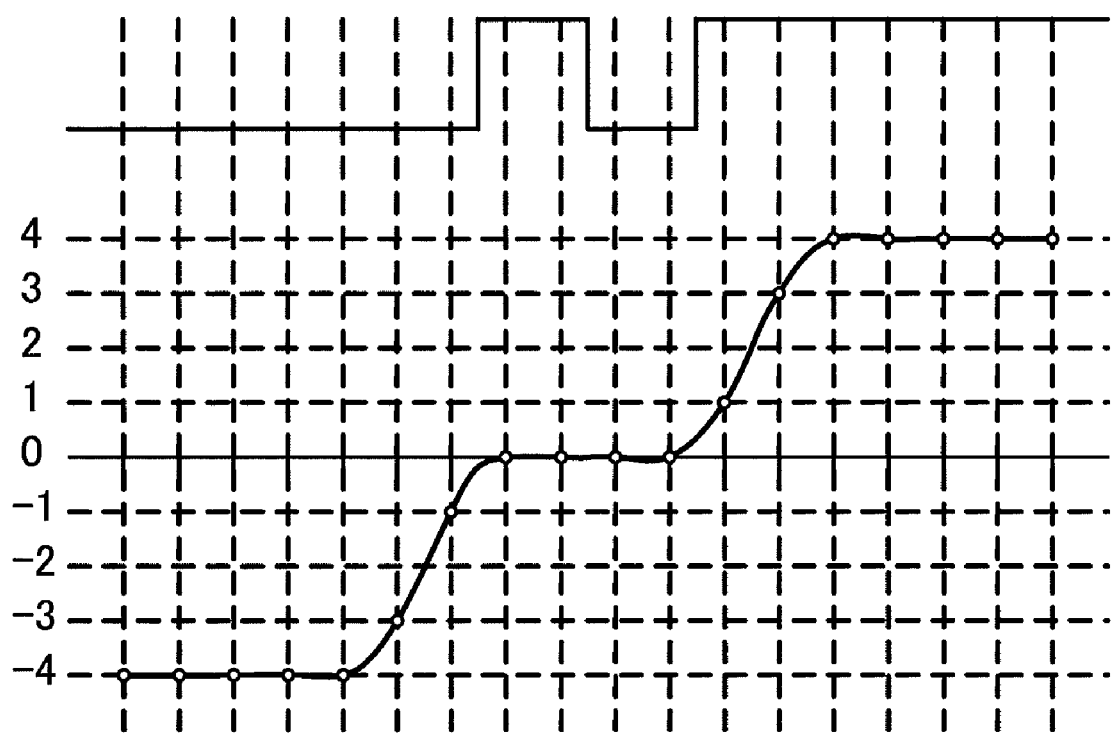
FIG. 25 is an explanatory diagram showing a conventional phase error detecting method.

When the phase error is corrected as described above, an advancing phase error can be output in a wider section as shown in FIG. 24. Therefore, it is possible to realize stable PLL that allows phase synchronization even when a large frequency error occurs.

It should be noted that the detailed configuration example of the phase error computing section or phase error correction section according to the present embodiment is merely one example, and therefore the present invention is not limited to this configuration as long as the phase error computing section or the phase error correction section allows correction similar to that described above.

As described above, a phase error detection device according to one aspect of the present invention is a phase error detection device for detecting a phase error, based on an output from an A/D conversion section that performs A/D conversion on an analog input signal in accordance with a sampling clock to generate a digital reproduction signal. The phase error detection device includes: a phase error generation section that generates the phase error from the output from the A/D conversion section; and a phase error correction section that corrects the phase error. The phase error correction section determines a phase error detection range from past phase errors and, when the phase error generated by the phase error generation section is out of the phase error detection range, corrects the phase error.

According to the configuration described above, the phase error correction section determines the phase error detection range from the past phase errors. When the phase error generated by the phase error generation section is out of the phase error detection range, the phase error correction section corrects the phase error. Thus, even when a frequency error occurs between a sampling clock and a digital reproduction signal, the phase error detection device allows detection of a phase error exceeding ±180°. When being applied to PLL, moreover, the phase error detection device allows improvement in stability of the PLL. In general, when a frequency error occurs, a small phase error is detected. This phase error becomes larger gradually. When the phase error exceeds 180°, phase inversion occurs at the phase error.

That is, the value of the phase error varies significantly when the phase error exceeds 180°. The phase error correction section determines the phase error detection range from the past phase errors. With regard to the phase error detection range determined from the past phase errors each of which does not exceed 180°, therefore, the phase error correction section can readily determine the phase error detection range such that the phase error which has exceeded 180° deviates from the phase error detection range. When the phase error exceeds 180°, the phase error correction section can correct the phase error such that no phase inversion occurs. Accordingly, the phase error detection device allows detection of a phase error having no phase inversion over a longer period of time as compared with a conventional case. Moreover, the phase error detection device allows stable phase synchronization even when a relatively large frequency error occurs. Further, the phase error detection device allows considerable improvement in stability of PLL as compared with a conventional case.

Preferably, the phase error correction section corrects the phase error generated by the phase error generation section by inverting a sign of the phase error.

In this case, the phase error correction section corrects the phase error generated by the phase error generation section by inverting the sign of the phase error. Therefore, when the phase error exceeds 180°, the phase error correction section can correct the phase error such that no phase inversion occurs. Accordingly, the phase error detection device allows detection of a phase error having no phase inversion over a longer period of time as compared with a conventional case. Moreover, the phase error detection device allows considerable improvement in stability of PLL as compared with a conventional case.

Preferably, the phase error correction section corrects the phase error generated by the phase error generation section to generate a value which is opposite in polarity to a sign of the phase error and has a predetermined degree.

In this case, the phase error correction section corrects the phase error generated by the phase error generation section to generate the value which is opposite in polarity to the sign of the phase error and has the predetermined degree. This configuration facilitates the correction processing. Therefore, when the phase error exceeds 180°, the phase error correction section can correct the phase error such that no phase inversion occurs. Accordingly, the phase error detection device allows detection of a phase error having no phase inversion over a longer period of time as compared with a conventional case. Moreover, the phase error detection device allows considerable improvement in stability of PLL as compared with a conventional case.

Preferably, the phase error correction section corrects the phase error generated by the phase error generation section to generate a value obtained by adding, to the phase error, a value which is opposite in polarity to the phase error and has a degree of 360°.

In this case, the phase error correction section corrects the phase error generated by the phase error generation section to generate the value obtained by adding, to the phase error, the value which is opposite in polarity to the phase error and has the degree of 360°. Therefore, when the phase error exceeds 180°, the phase error correction section can accurately correct the phase error such that no phase inversion occurs. Accordingly, the phase error detection device allows detection of a phase error having no phase inversion over a longer period of time as compared with a conventional case. Moreover, the phase error detection device allows considerable improvement in stability of PLL as compared with a conventional case.

Preferably, the phase error correction section determines the phase error detection range from an average value of the predetermined number of past phase errors.

In this case, the phase error correction section determines the phase error detection range from the average of the plurality of past phase errors. Therefore, the phase error detection range can be set more accurately as compared with a case where a phase error detection range is determined from only a preceding phase error.

Preferably, the phase error correction section determines a center of the phase error detection range from an approximate straight line obtained from three or more past phase errors.

In this case, the phase error correction section determines the phase error detection range from the approximate straight line obtained from the three or more past phase errors. Therefore, the phase error detection range can be set more accurately.

Preferably, the phase error detection range determined by the phase error correction section has at least an upper limit or a lower limit set therefor.

In this case, even when a phase error is erroneously and continuously detected because of an influence of noise and the like, at least the upper limit or the lower limit set for the phase error detection range allows avoidance of such a situation that the subsequent phase error is erroneously corrected continuously.

Also preferably, the phase error generation section includes: an equalization section that equalizes the digital reproduction signal to generate an equalization signal having a predetermined equalization characteristic; a binarization section that binarizes the equalization signal to generate a binarization signal; and a computing section that computes the phase error, and the computing section includes: a difference metric computing section that generates an ideal reproduction signal from the binarization signal, based on the equalization characteristic, calculates a first metric between the equalization signal and the ideal reproduction signal, generates an ideal comparison signal from a comparison signal obtained by shifting a rising or falling edge of the binarization signal by one time, based on the equalization characteristic, calculates a second metric between the equalization signal and the ideal comparison signal, and computes a difference metric between the first metric and the second metric; a distance computing section that calculates a square of a Euclidean distance between the ideal reproduction signal and the ideal comparison signal; and a phase error computing section that calculates a phase error from a difference between the difference metric and the square of the Euclidean distance.

According to the configuration described above, the ideal comparison signal is generated from the comparison signal obtained by shifting the edge of the binarization signal by one time, based on the equalization characteristic of the equalization section. Moreover, the ideal reproduction signal is generated from the binarization signal, based on the equalization characteristic of the equalization section. Then, the phase error is calculated from the computing results of the first metric between the equalization signal and the ideal reproduction signal, the second metric between the equalization signal and the ideal comparison signal, the difference metric between the first metric and the second metric, the square of the Euclidean distance between the ideal reproduction signal and the ideal comparison signal, and the difference between the difference metric and the square of the Euclidean distance. As described above, since the phase error is calculated using the comparison signal obtained by shifting the edge of the binarization signal by one time, such a phase error can be generated quickly and accurately.

Preferably, the phase error correction section corrects the phase error when the difference metric is equal to or less than the square of the Euclidean distance between the ideal reproduction signal and the ideal comparison signal, and makes the phase error invalid when the difference metric is larger than the square of the Euclidean distance between the ideal reproduction signal and the ideal comparison signal.

In this case, it is assumed that the phase error generated by the phase error generation section is out of the phase error detection range determined from the past phase errors. Herein, when the difference metric is equal to or less than the square of the Euclidean distance, the phase error is corrected. On the other hand, when the difference metric is larger than the square of the Euclidean distance, the phase error is made invalid. Thus, when the phase error is erroneously detected because of an influence of noise and the like, this phase error is made invalid. As a result, PLL can be further improved in stability.

Preferably, the phase error correction section corrects the phase error generated by the phase error generation section by correcting the binarization signal to regenerate the phase error.

In this case, the phase error is regenerated by correction of the binarization signal, so that the phase error can be corrected accurately using the computing processing performed by the computing section.

Preferably, the phase error correction section corrects the phase error generated by the phase error generation section by inverting a sign of the difference metric to regenerate the phase error.

In this case, the phase error is regenerated by inversion of the sign of the difference metric, so that the phase error can be corrected accurately using the computing processing performed by the computing section.

A phase error detecting method according to another aspect of the present invention is a phase error detecting method for detecting a phase error, based on an output from an A/D conversion section that performs A/D conversion on an analog input signal in accordance with a sampling clock to generate a digital reproduction signal. The phase error detecting method includes: a phase error generating step of generating the phase error from the output from the A/D conversion section; and a phase error correcting step of correcting the phase error. In the phase error correcting step, a phase error detection range is determined from past phase errors and the phase error is corrected when the phase error generated in the phase error generating step is out of the phase error detection range.

The phase error detecting method allows detection of a phase error exceeding $\pm 180°$ even when a frequency error occurs between a sampling clock and a digital reproduction signal. When being applied to PLL, the phase error detecting method allows improvement in stability of the PLL.

An integrated circuit according to still another aspect of the present invention is an integrated circuit including: an A/D conversion section that performs A/D conversion on an analog input signal in accordance with a sampling clock to generate a digital reproduction signal; a phase error generation section that generates a phase error from the output from the A/D conversion section; and a phase error correction section that corrects the phase error. The phase error correction section determines a phase error detection range from past phase errors and, when the phase error generated by the phase error generation section is out of the phase error detection range, corrects the phase error.

The integrated circuit allows detection of a phase error exceeding $\pm 180°$ even when a frequency error occurs between a sampling clock and a digital reproduction signal. When being applied to PLL, the integrated circuit allows improvement in stability of the PLL.

An optical disc device according to yet another aspect of the present invention is an optical disc device including: an optical head section that reads out information from an optical disc to generate an analog reproduction signal; and a PLL section that generates a sampling clock brought into phase synchronization with the analog reproduction signal. The PLL section includes the phase error detection device described above.

The optical disc device allows detection of a phase error exceeding $\pm 180°$ even when a frequency error occurs between a sampling clock and a digital reproduction signal, and also allows improvement in stability of the PLL section.

The present invention is particularly useful as a phase error detector to be employed for PLL in an optical disc device and the like.

This application is based on Japanese Patent Application No. 2008-329336 filed on Dec. 25, 2008, the contents of which are hereby incorporated by reference.

Specific embodiments or examples used for the detailed description of the invention are merely for clarifying the technical content of the present invention, and the present invention should not be interpreted within these limited examples, but can be modified in various ways within the sprit of the present invention and scope of the claims described herein below.

What is claimed is:

1. An integrated circuit comprising:
an A/D conversion section that performs A/D conversion on an analog input signal in accordance with a sampling clock to generate a digital reproduction signal;
a phase error generation section that generates a phase error from the digital reproduction signal output from said A/D conversion section; and
a phase error correction section that corrects the phase error, wherein:
said phase error correction section determines a phase error detection range using past phase errors generated by said phase error generation section or past correction phase errors corrected by said phase error correction section;
when the phase error generated by said phase error generation section is out of the phase error detection range, said phase error correction section corrects the phase error; and
said phase error correction section corrects the phase error generated by said phrase error generation section by inverting a sign of the phase error.

2. An integrated circuit comprising:
an A/D conversion section that performs A/D conversion on an analog input signal in accordance with a sampling clock to generate a digital reproduction signal;
a phase error generation section that generates a phase error from the digital reproduction signal output from said A/D conversion section; and
a phase error correction section that corrects the phase error, wherein:
said phase error correction section determines a phase error detection range using past phase errors generated by said phase error generation section or past correction phase errors corrected by said phase error correction section;
when the phase error generated by said phase error generation section is out of the phase error detection range, said phase error correction section corrects the phase error; and
said phase error correction section corrects the phase error generated by said phase error generation section to generate a value which is opposite in polarity to a sign of the phase error and has a predetermined degree.

3. An integrated circuit comprising:
an A/D conversion section that performs A/D conversion on an analog input signal in accordance with a sampling clock to generate a digital reproduction signal;
a phase error generation section that generates a phase error from the digital reproduction signal output from said A/D conversion section; and
a phase error correction section that corrects the phase error, wherein:
said phase error correction section determines a phase error detection range using past phase errors generated by said phase error generation section or past correction phase errors corrected by said phase error correction section;
when the phase error generated by said phase error generation section is out of the phase error detection range, said phase error correction section corrects the phase error; and
said phase error correction section corrects the phase error generated by said phase error generation section to generate a value obtained by adding, to the phase error, a value which is opposite in polarity to the phase error and has a degree of 360°.

4. An integrated circuit comprising:
an A/D conversion section that performs A/D conversion on an analog input signal in accordance with a sampling clock to generate a digital reproduction signal;
a phase error generation section that generates a phase error from the digital reproduction signal output from said A/D conversion section; and
a phase error correction section that corrects the phase error, wherein:
said phase error correction section determines a phase error detection range using past phase errors generated by said phase error generation section or past correction phase errors corrected by said phase error correction section;
when the phase error generated by said phase error generation section is out of the phase error detection range, said phase error correction section corrects the phase error; and
said phase error correction section determines a center of the phase error detection range from an approximate straight line obtained from three or more past phase errors.

5. An integrated circuit comprising:
an A/D conversion section that performs A/D conversion on an analog input signal in accordance with a sampling clock to generate a digital reproduction signal;
a phase error generation section that generates a phase error from the digital reproduction signal output from said A/D conversion section; and
a phase error correction section that corrects the phase error,
wherein said phase error correction section determines a phase error detection range using past phase errors generated by said phase error generation section or past correction phase errors corrected by said phase error correction section,
wherein, when the phase error generated by said phase error generation section is out of the phase error detection range, said phase error correction section corrects the phase error,
wherein said phase error generation section includes:
an equalization section that equalizes the digital reproduction signal to generate an equalization signal having a predetermined equalization characteristic;
a binarization section that binarizes the equalization signal to generate a binarization signal; and
a computing section that computes the phase error, and
wherein said computing section includes:
a difference metric computing section that generates an ideal reproduction signal from the binarization signal, based on the equalization characteristic, calculates a first metric between the equalization signal and the ideal reproduction signal, generates an ideal comparison signal from a comparison signal obtained by shifting a rising or falling edge of the binarization signal by one time, based on the equalization characteristic, calculates a second metric between the equalization signal and the ideal comparison signal, and computes a difference metric between the first metric and the second metric;
a distance computing section that calculates a square of a Euclidean distance between the ideal reproduction signal and the ideal comparison signal; and a phase error computing section that calculates a phase error from a difference between the difference metric and the square of the Euclidean distance.

6. The integrated circuit according to claim 5, wherein said phase error correction section corrects the phase error when the difference metric is equal to or less than the square of the Euclidean distance between the ideal reproduction signal and the ideal comparison signal, and makes the phase error invalid when the difference metric is larger than the square of the Euclidean distance between the ideal reproduction signal and the ideal comparison signal.

7. The integrated circuit according to claim 5, wherein said phase error correction section corrects the phase error generated by said phase error generation section by correcting the binarization signal to regenerate the phase error.

8. The integrated circuit according to claim 5, wherein said phase error correction section corrects the phase error generated by said phase error generation section by inverting a sign of the difference metric to regenerate the phase error.

9. An optical disc device comprising:
an optical head section that reads out information from an optical disc to generate an analog reproduction signal; and
a PLL section that generates a sampling clock brought into phase synchronization with the analog reproduction signal, wherein:
the PLL section includes the integrated circuit of claim 1 as a phase error detection device.

* * * * *